United States Patent [19]
Tominaga et al.

[11] Patent Number: 6,164,932
[45] Date of Patent: Dec. 26, 2000

[54] AQUARIUM PUMP FOR USE BOTH AS AN AIR PUMP AND A WATER PUMP AND AQUARIUM APPARATUS WITH A PASSAGE AQUARIUM

[75] Inventors: Kazutoshi Tominaga; Yoji Takano, both of Osaka, Japan

[73] Assignee: Kabushiki Kaisha Tominaga Jyushi Kogyosho, Osaka, Japan

[21] Appl. No.: 09/408,523

[22] Filed: Sep. 30, 1999

[30] Foreign Application Priority Data

Oct. 5, 1998 [JP] Japan .................................. 10-282832
Aug. 6, 1999 [JP] Japan .................................. 11-223718

[51] Int. Cl.[7] .................................................. F04B 17/00
[52] U.S. Cl. .................................. 417/413.1; 417/199.1; 417/201; 417/204
[58] Field of Search .................................. 417/413, 415, 417/199.1, 201, 204, 424.1; 119/248

[56] References Cited

U.S. PATENT DOCUMENTS

| | | | |
|---|---|---|---|
| 3,635,592 | 1/1972 | Kolfertz | 417/413.1 |
| 4,406,591 | 9/1983 | Louis | 417/363 |
| 4,608,000 | 8/1986 | Tominaga | 417/413.1 |
| 4,817,561 | 4/1989 | Byrne et al. | 119/260 |
| 5,058,529 | 10/1991 | Chiu | 119/263 |
| 5,066,204 | 11/1991 | Point et al. | 417/413.1 |
| 5,137,423 | 8/1992 | Eda et al. | 415/202 |
| 5,188,516 | 2/1993 | Huang | 417/199.1 |
| 5,360,323 | 11/1994 | Hsieh | 417/413.1 |
| 5,730,587 | 3/1998 | Snyder et al. | 417/413.1 |
| 5,988,601 | 11/1999 | Burgess | 261/34.1 |

FOREIGN PATENT DOCUMENTS 58-105870  7/1983  Japan .

*Primary Examiner*—Philip H. Leung
*Assistant Examiner*—Jeffrey Pwu
*Attorney, Agent, or Firm*—Armstrong, Westerman, Hattori, McLeland & Naughton

[57] ABSTRACT

An aquarium pump for use both as an air pump and a water pump, includes an electromagnet, a diaphragm reciprocally driven by the electromagnet, an outer casing in which said electromagnet and said diaphragm are accommodated, an inlet and an outlet each outwardly protruding from said outer casing. The pump has an inlet passage provided in the outer casing, the inlet passage communicating the inlet and an inside of the diaphragm in a fluid-sealed manner, and an outlet passage provided in the outer casing, the outlet passage communicating the outlet and said inside of said diaphragm in a fluid-sealed manner. The inlet, the inlet passage, the inside of the diaphragm and the outlet constitute a fluid-sealed passage so that the aquarium pump functions both as an air pump and a water pump. The aquarium pump may preferably be used for an aquarium apparatus with a passage aquarium.

8 Claims, 19 Drawing Sheets

AQUARIUM PUMP FOR USE BOTH AS AN AIR PUMP AND A WATER PUMP AND AQUARIUM APPARATUS WITH A PASSAGE AQUARIUM

BACKGROUND OF THE INVENTION

1. Field of the Invention

This invention relates to an aquarium pump for use both as an air pump and as a water pump for supplying air into water filled in an aquarium or for circulating the water, and further relates to an aquarium apparatus equipped with a passage aquarium which causes less operation noise and which enables an easy initial operation.

2. Description of the Related Art

It is a popular practice to keep ornamental fish in an aquarium, enjoying them as a part of an interior of a house or an office. An air pump is generally used for supplying air to water contained in the aquarium.

One example of this kind of conventional air pump is shown in FIG. 26. This air pump has a box-shaped main casing 100 with an opened bottom, an electromagnet 101 fixed to one of the opposing peripheral walls of the main casing 100, and a vibration arm 102 having one end fixed to the other opposing peripheral wall of the main casing 100. On the other end of the vibration arm 102, a permanent magnet 103 is attached so as to oppose to the core portion 101a of the electromagnet 101 at a close distance. A diaphragm 104 made of rubber is attached to a longitudinal central portion of the vibration arm 102. The diaphragm 104 is fitted onto a valve-housing 105 having an inlet opening 106a with an elastic inlet valve 108 and an outlet opening 106b with an elastic outlet valve 107. An inside of the diaphragm 104 communicates with an outlet port 109 which outwardly protrudes from the main casing 100 via the outlet valve 107, and also communicates with an inlet port 110 disposed in the main casing 100 via the inlet valve 108. The opened bottom of the main casing 100 is closed by a bottom wall (not shown).

When an alternating current passes through the electromagnet 101, the permanent magnet 103 begins to reciprocate in accordance with the alternating electromagnetic fields of the electromagnet 101 in the direction of the arrows shown in FIG. 26. This causes reciprocative movement of the vibration arm 102, which in turn causes a repetition of expansion and compression of the diaphragm 104. When the diaphragm 104 is compressed, the outlet valve 107 opens to send air confined in the diaphragm 104 out of the main casing 100 through the outlet port 109. On the other hand, when the diaphragm 104 is expanded, the outlet valve 107 closes and the inlet valve 108 opens to introduce air into the diaphragm 104 through the inlet port 110 disposed in the main casing 100. In accordance with the repetition of expansion and compression of the diaphragm 104, air is supplied to an aquarium through the outlet port 109.

In the conventional air pump, the inlet port 110 is disposed inside the main casing 100 because, if the inlet port 110 is provided outside the main casing 100, noise generated by the pump will directly leak through the inlet port 110.

In addition, various aquariums equipped with a passage aquarium portion through which fish can come and go freely have been proposed because such a passage aquarium portion can enhance the ornamental effect of the aquarium. For example, Japanese Utility Model Laid-open Publication No. 58-105870 discloses an aquarium that is divided into two separate aquarium portions by a central partition, and an inverted generally U-shaped passage aquarium portion having opposite end openings is disposed above the aquarium. Each of the opposite end openings of the passage aquarium portion is disposed in the water contained in a respective one of the separate aquarium portions with water filled in the passage aquarium portion so that fish can freely pass through the passage aquarium portion. Furthermore, a water pump driven by an electric motor is used so as to suck water from one of the separate aquarium portions via an inlet pipe and so as to send out the sucked water to the other separate aquarium portion via an outlet pipe. Thus, the water filled in the two separate aquarium portions can be circulated through the passage aquarium portion.

However, in the aforementioned aquarium equipped with a passage aquarium portion, since a water pump driven by an electric motor is used, the noise caused by the motor and/or the water pump is loud. Thus, the noise can be undesirably loud when the aquarium is placed in a quiet environment such as in a quiet room or office. Especially, at nighttime, the noise is augmented because the environment is quieter, which may make the user more uncomfortable, deteriorating the user's concentration, or even disturbing the user's sleep. Thus, the level of noise may sometimes go beyond the user's endurance range. As a result, it is strongly required to lower the noise level during the operation of the water pump.

Also, in the aforementioned aquarium equipped with a passage aquarium portion, water must be filled in the passage aquarium portion by sucking air from the passage aquarium portion before operating the water pump. This requires time and troublesome initial operation of the system. Accordingly, it is necessary to establish a new system which is simple in initial operation.

SUMMARY OF THE INVENTION

The present invention solves the aforementioned drawbacks.

It is an object of the present invention to provide an aquarium pump for use both as an air pump and as a water pump which has a low manufacturing cost and a low noise level.

Another object of the present invention is to provide an aquarium apparatus equipped with a passage aquarium which enables a simple initial operation and a good water circulation of the passage aquarium.

To attain the aforementioned objects, the inventor of the present invention has studied and found that a conventional air pump with a diaphragm, which has been used only for supplying air to an aquarium, can be used as a water pump if the inlet and outlet are provided so as to protrude from the outer casing of the air pump and the passage from the inlet to the outlet constitutes a fluid-sealed passage. The inventor also found that when the aforementioned pump is used as a water pump for an aquarium apparatus with a passage aquarium, the operation noise can be effectively decreased and an initial operation can be simplified. Based on the above, the present invention has been completed.

In other words, conventionally, an air pump utilizing a diaphragm was never used for pumping water. Nevertheless, in such a technical background, the inventor has found that such an air pump can also be used as a water pump and can be operated while decreasing the operation noise to an extremely low level.

According to one aspect of the present invention, an aquarium pump for use both as an air pump and a water pump includes:

an electromagnet;

a diaphragm reciprocally driven by the electromagnet;

an outer casing in which the electromagnet and the diaphragm are accommodated;

an inlet outwardly protruding from the outer casing;

an outlet outwardly protruding from the outer casing;

an inlet passage provided in the outer casing, the inlet passage communicating the inlet and an inside of the diaphragm in fluid-sealed manner; and an outlet passage provided in the outer casing, the outlet passage communicating the outlet and the inside of the diaphragm in fluid-sealed manner, wherein the inlet, the inlet passage, the inside of the diaphragm, the outlet passage and the outlet constitute a fluid-sealed passage so that the aquarium pump functions both as an air pump and a water pump.

Since the inlet is provided so as to protrude from the outer casing, the aquarium pump can also be used as a water pump by connecting a tube or a pipe to the inlet. In a case where the aquarium pump is used as a water pump, since the passage from the inlet to the outlet is formed as a fluid-sealed passage, water can be consistently forwarded without leaking. Since the passage is filled with water, noise, which is usually generated in accordance with compression and expansion of the diaphragm, can be eliminated effectively. Thus, the aquarium pump can be operated at an extremely low noise level, whereby the environment can be kept quiet. Furthermore, since the aquarium pump has a diaphragm, it is simple in structure and can be manufactured at a low cost.

In a case that the inlet passage and the outlet passages is provided with an inlet valve and an outlet valve, respectively, so that air or water is introduced into the diaphragm via the inlet valve when the diaphragm is expanded and sent out of the diaphragm via the outlet valve when the diaphragm is compressed, since air or water is introduced into or sent out of the diaphragm in accordance with the compression and expansion of the diaphragm, air or water can be sent out consistently and continuously.

It is preferable that the diaphragm is provided with a plurality of inlet valves. This structure increases the pumping ability of the aquarium pump.

It is more preferable that the diaphragm is provided with a plurality of outlet valves. This structure further increases the pumping ability of the aquarium pump.

It is preferable that the space for disposing the electromagnet and the space for disposing the pump casing are partitioned in a water-sealed manner. This prevents water from affecting the electromagnet even if water leaks out of the pump casing, resulting in a trouble-free apparatus. Concretely, a water-sealing partition may be provided between the electromagnet and the fluid-sealed passage. This simplifies the structure of the aquarium pump, resulting in a low manufacturing cost and enhanced safety.

It is preferable that the outer casing includes a lower casing with an opened upper end and an upper casing fitted on the lower casing, and a first water-sealing partition protrudes upwardly from the bottom wall of the lower casing and a second water-sealing partition protrudes downwardly from the top wall of the upper casing, and the top end of the first water-sealing partition is fitted on the top end of the second water-sealing partition so that the water-sealing partition is formed. This results in an easy assembly of the outer casing, a reduced manufacturing cost and an enhanced safety. Furthermore, the aforementioned structure enables an easy and simple maintenance. According to another aspect of the present invention, an aquarium apparatus with a passage aquarium includes:

a main aquarium;

a passage aquarium disposed above the main aquarium with end openings thereof disposed in the main aquarium so as to allow fish to pass through the passage aquarium;

an aquarium pump having an inlet and an outlet;

an outlet opening provided on a top portion of the passage aquarium;

an outlet pipe connecting the outlet opening and the inlet of the aquarium pump; and an inlet pipe having two ends, one end being connected to the outlet opening of the passage aquarium and the other end being disposed above or in water filled in the main aquarium.

According to still another aspect of the present invention, an aquarium apparatus with a passage aquarium, includes:

a plurality of main aquariums;

one or more passage aquariums disposed above the main aquariums so as to bridge the main aquariums with end openings thereof disposed in respective main aquariums so as to allow fish to pass through the passage aquariums;

an aquarium pump having an inlet and an outlet;

an outlet opening provided on a top portion of at least one of the passage aquariums;

an outlet pipe connecting the outlet opening and the inlet of the aquarium pump; and an inlet pipe having two ends, one end thereof being connected to the outlet opening of the passage aquarium and the other end being disposed above or in water filled in the main aquarium.

In the aquarium apparatus equipped with a passage aquarium mentioned above, since water filled in the passage aquarium can be pumped out through the outlet opening provided at the top portion of the passage aquarium, the water in the passage aquarium can be circulated effectively. Therefore, this system can prevent fish from dying in the passage aquarium due to the spoiling of water stagnating in the passage aquarium. Furthermore, the initial operation of the aquarium apparatus can be conducted by simply activating the aquarium pump. In detail, when the aquarium pump is activated, the air in the passage aquarium is removed, which in turn causes the passage aquarium to be filled with water in the main aquarium, resulting in a regular circulation of water in the passage aquarium. Thus, the initial operation for the aquarium equipped with a passage aquarium can be simplified.

It is preferable that the passage aquarium is an inverted generally U-shaped pipe having end openings to be disposed in the main aquarium. In this case, fish can pass through the passage aquarium. This further enhances the ornamental effect.

BRIEF DESCRIPTION OF DRAWINGS

The above and other objects, features, and advantages of the present invention will be apparent from the following detailed description of the preferred embodiments with reference to the attached drawings, wherein:

FIG. 10 illustrates an aquarium pump for use both as an air pump and a water pump according to the second embodiment of the present invention, wherein

FIG. 19 illustrates a first valve body shown in FIG. 14, wherein

FIG. 20 illustrates a second valve body shown in FIG. 14, wherein

FIG. 21 illustrates a valve body of another example.

Figure 1A:
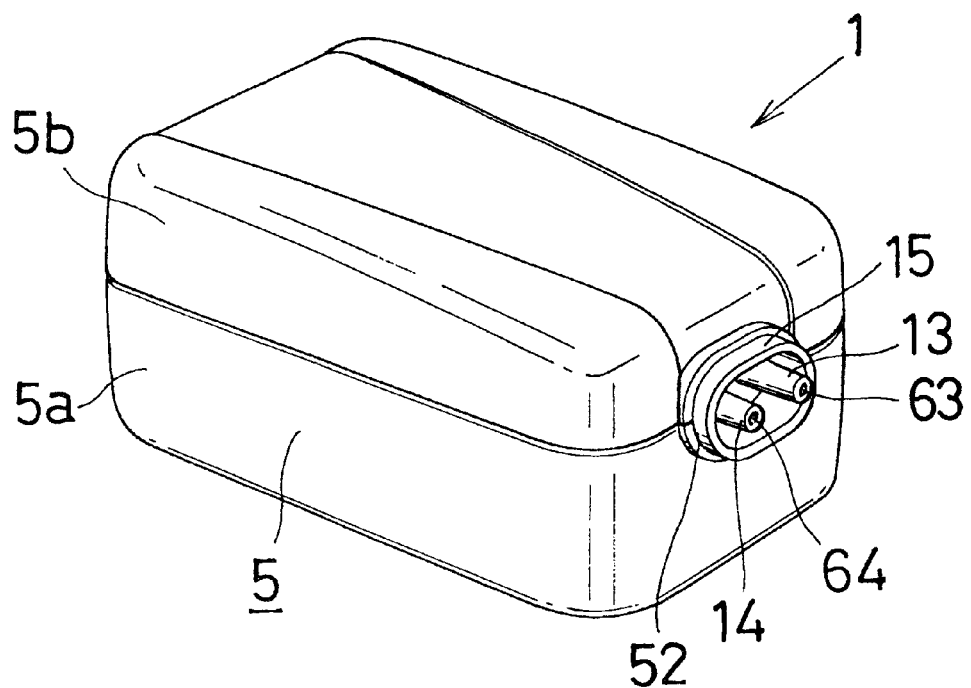
FIG. 1A is a perspective view of an aquarium pump for use both as an air pump and a water pump according to the first embodiment of the present invention.

DETAILED DESCRIPTION OF THE PREFERRED EMBODIMENTS (First Embodiment)

An aquarium pump for use both as an air pump and a water pump according to the first embodiment of the present invention will be explained with reference to FIGS. 1 to 9.

As shown in FIGS. 1–5, an aquarium pump 1 for use both as an air pump and a water pump includes an electromagnet 2, a vibration arm 3, a diaphragm 4, an outer casing 5, a pump casing 9, an inlet side chamber 11, an outlet side chamber 12, an inlet pipe 13, an outlet pipe 14, and a valve body 31.

Figure 2:
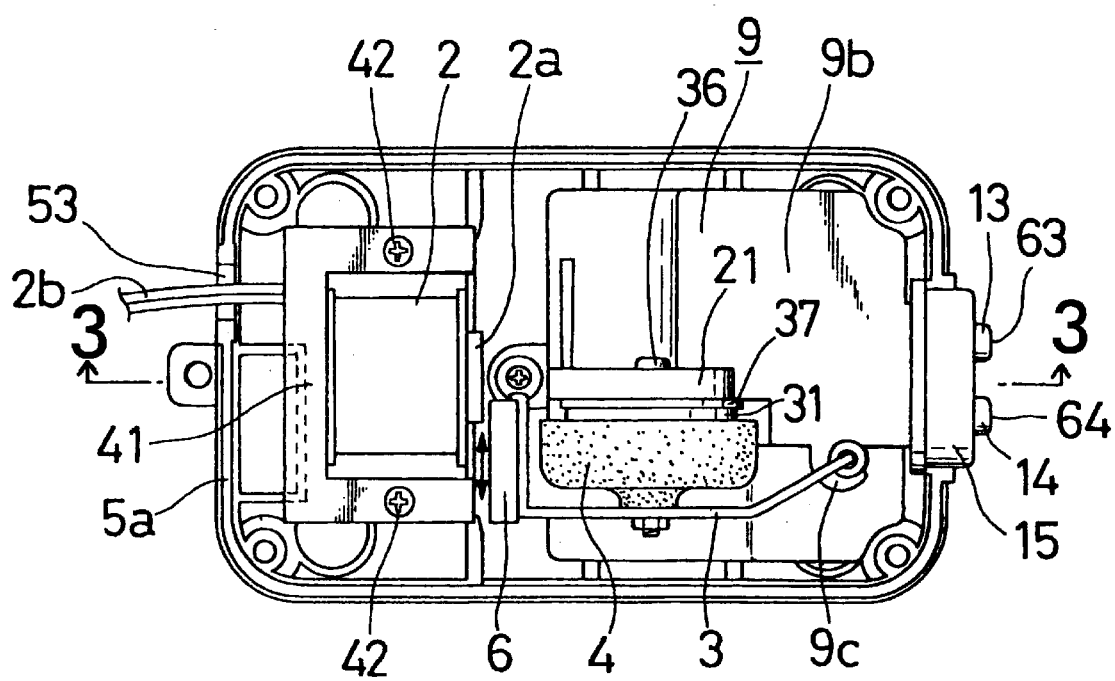
FIG. 2 is a top view of the aquarium pump in a state in which an upper outer casing is removed.

As shown in FIG. 1A, the aquarium pump 1 is of a generally rectangular box shape, and the outer casing 5 includes a lower outer casing 5a with an opened upper end and an upper outer casing 5b with a closed top and an opened lower end. The upper outer casing 5b is coupled on the lower outer casing 5a in an air-tight manner. At one of its end walls located along the longitudinal direction of the outer casing 5, a first opening 52 for outwardly protruding a protruded portion 15 of the pump casing 9 is provided. As shown in FIG. 2, at the other end wall of the outer casing 5, a second opening 53 for fitting an electric cord is provided.

Figure 1B:
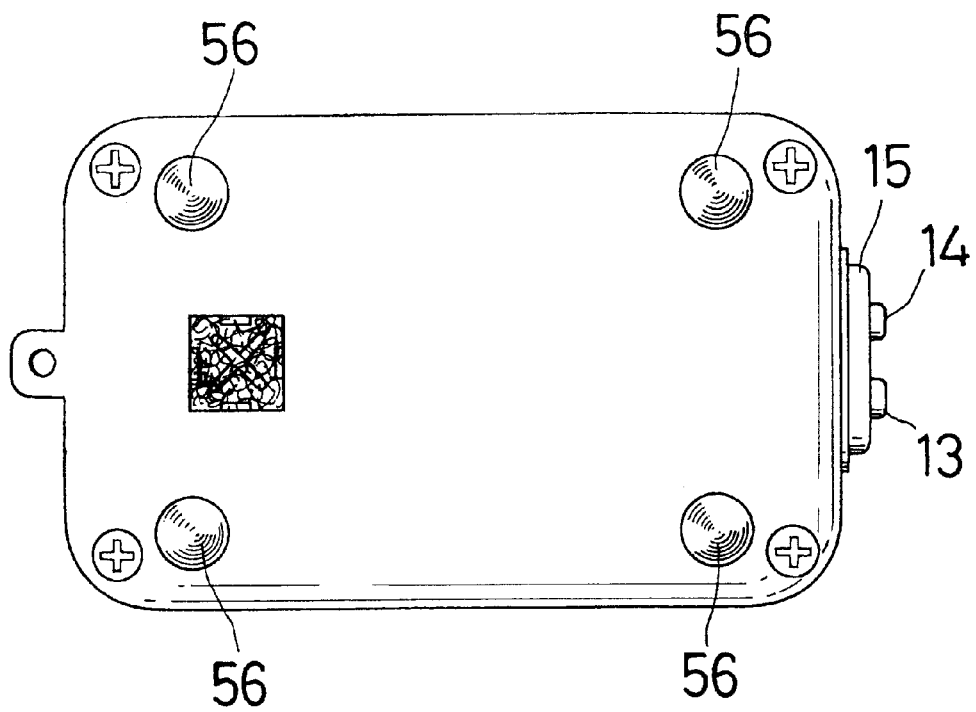
FIG. 1B is a bottom view thereof.

As shown in FIG. 1B, the bottom wall of the lower outer casing 5a has, at each corner portion, a generally cone-shaped hollow supporting leg 56 made of soft material such as rubber. These soft hollow supporting legs 56 can effectively absorb vibrations of the aquarium pump 1 during operation, which decreases the transmission of vibrations of the aquarium pump 1 to a table or the like on which the aquarium pump 1 is placed. Accordingly, the noise, which is generated by a resonance of the table or the like, can be effectively decreased.

Figure 3:
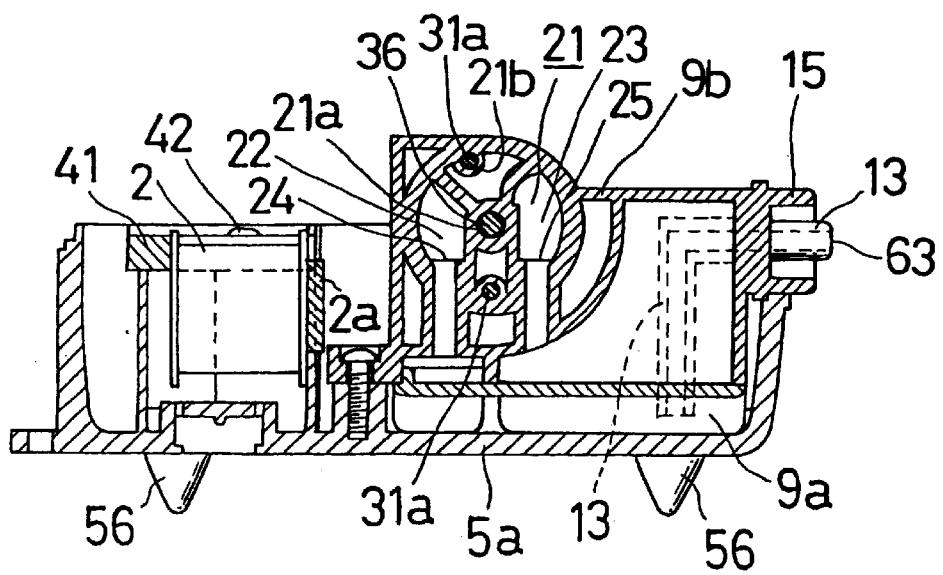
FIG. 3 is a cross-sectional view taken along the lines A—A in FIG. 2.
Figure 4:
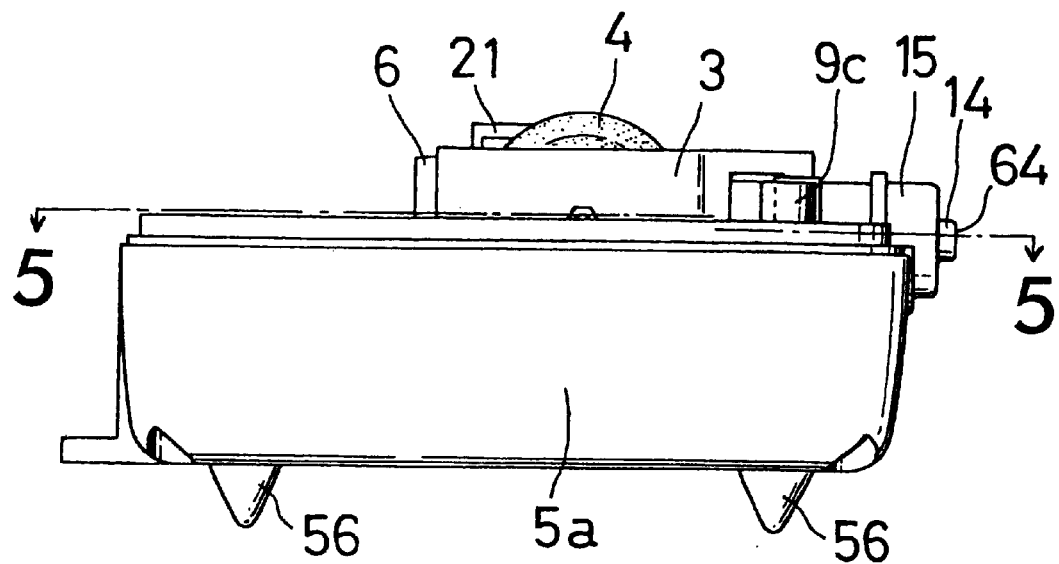
FIG. 4 is a front view of the aquarium pump in a state in which the upper outer casing is removed.

As shown in FIGS. 2 to 4, the electromagnet 2 is disposed in one side of the lower outer casing 5a, i.e., the left side of the lower outer casing 5a, and fixed thereto by tightening the screws 42, which penetrate a flange portion 41 of the electromagnet 2 and engage with screw holes (not shown) formed on the bottom wall of the lower outer casing 5a. The electric cord 2b connected to the coil of the electromagnet 2 is extended out of the outer casing 5 through the second opening 53, as shown in FIG. 2.

As shown in FIGS. 5 to 8, the pump casing 9 has an inner space divided into an inlet side chamber 11 and an outlet side chamber 12. The pump casing 9 includes a shallow dish-shaped lower basal pump casing 9a with an opened upper end and an upper main pump casing 9b fluid-tightly fitted on the lower basal pump casing 9a. Both the upper and lower casings 9a and 9b are synthetic molded articles.

Figure 7:
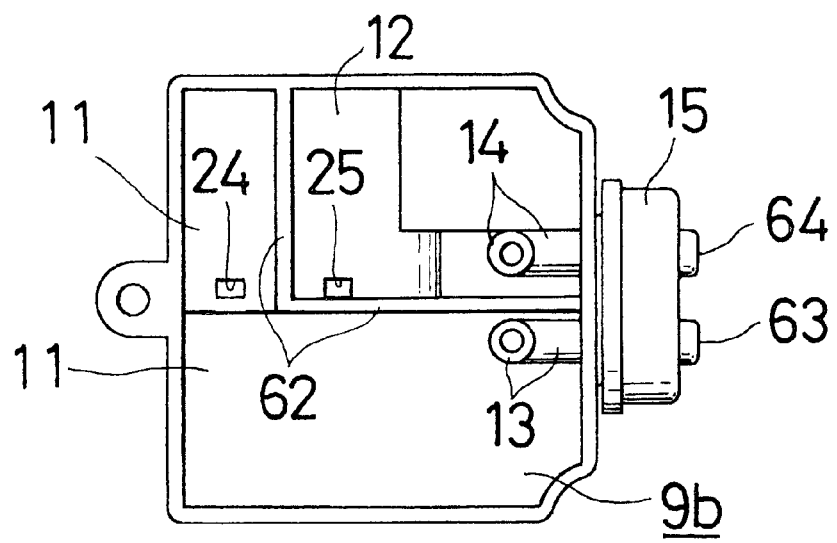
FIG. 7 is a bottom view of an upper main pump casing.
Figure 8:
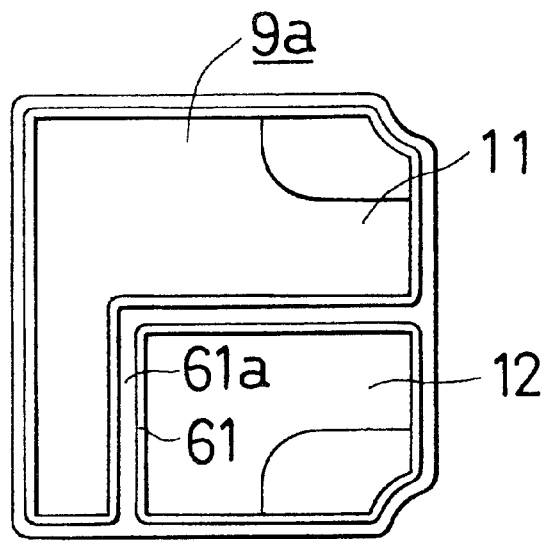
FIG. 8 is a top view of a lower basal pump casing.

As shown in FIG. 8, the lower basal pump casing 9a has an upwardly protruded L-shaped lower partition 61 for partitioning the inside space into the inlet side chamber 11 and the outlet side chamber 12. Along the upper edge of the lower partition 61, a groove 61a is formed. As shown in FIG. 7, the upper main pump casing 9b has a downwardly protruded L-shaped upper partition 62 for partitioning the inside space into the inlet side chamber 11 and the outlet side chamber 12. The upper main pump casing 9b is disposed on the lower basal pump casing 9a, and the lower end of the upper partition 62 is fluid-tightly fitted in the groove 61a of the lower partition 61, whereby the inside space of the pump casing 9 is divided into two fluid-tight independent chambers 11 and 12, i.e., the inlet side chamber 11 and the outlet side chamber 12.

As shown in FIG. 7, on the upper side wall of the upper main pump casing 9b, a protruded portion 15 is formed. An inlet pipe 13 and an outlet pipe 14 are disposed in the protruded portion 15 in a parallel relation. The inlet pipe 13 is extended into the inlet side chamber 11 and is bent downwardly to have an opened end in the inlet side chamber 11. Similarly, the outlet pipe 14 is extended into the outlet side chamber 12 and is bent downwardly to have an opened end in the outlet side chamber 12.

Figure 6:
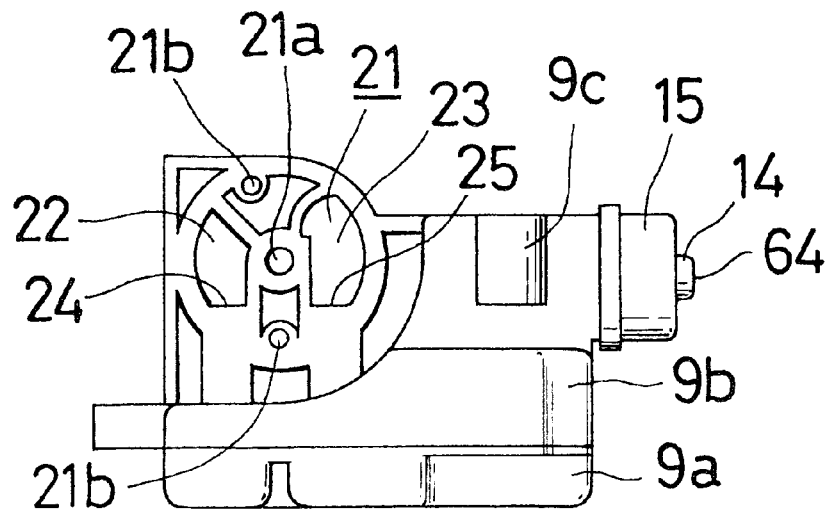
FIG. 6 is a front view of a pump casing.

As shown in FIG. 6, a vertical plate-shaped diaphragm connecting portion 21 is integrally formed on the upper main pump casing 9b. At the central portion of the diaphragm connecting portion 21, a bolt-insertion hole 21a for fixing the valve body 31 is formed. At the opposing edge portions of the diaphragm connecting portion 21, engaging holes 21b and 21b are formed for positioning the valve body 31 and for preventing the valve body 31 from rotating on the diaphragm connecting portion 21. At both sides of the bolt-insertion hole 21a, i.e., the right and left sides of the bolt-insertion hole 21a, an inlet dented portion 22 and an outlet dented portion 23 are formed. The inlet dented portion 22 is in communication with the inlet side chamber 11 by way of an inlet port 24 formed in the bottom wall of the inlet dented portion 22. The outlet dented portion 23 is in communication with the outlet side chamber 12 by way of an outlet port 25 formed in the bottom wall of the outlet dented portion 23.

Figure 5:
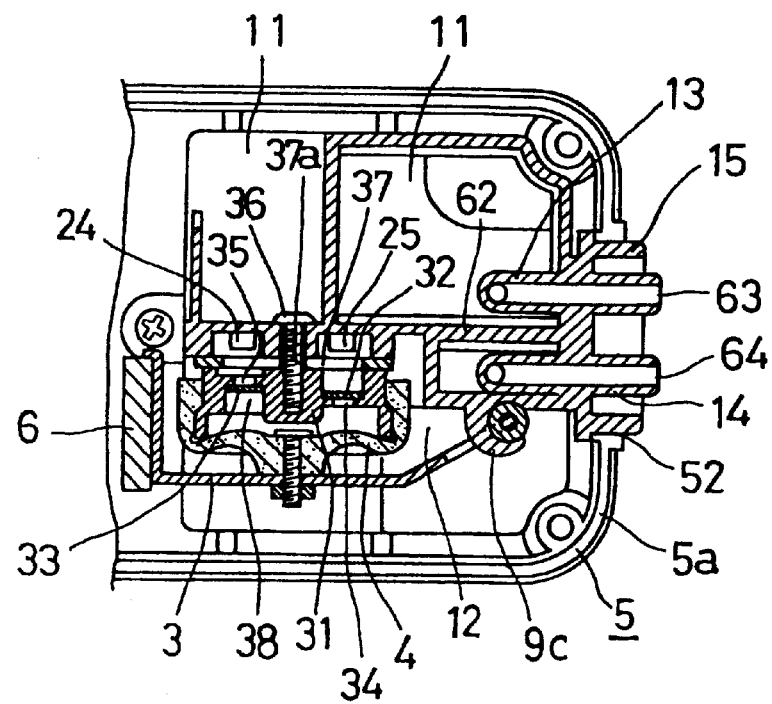
FIG. 5 is a partial cross-sectional view taken along the lines C—C in FIG. 4.

As shown in FIG. 5, the generally cylindrical valve body 31 is attached to the diaphragm connecting portion 21 via a packing 37.

Fitted on the valve body 31 is the cup-shaped diaphragm 4 made of rubber. The valve body 31 has a pair of engaging protrusions 31a and 31a. As shown in FIGS. 2, 3 and 5, the valve body 31 is connected to the diaphragm connecting portion 21 via the packing 37 by tightening a bolt 36, which is inserted in the bolt-insertion hole 21a of the diaphragm connecting portion 21 and a bolt-insertion hole 37a formed in the packing 37 and engaged with an engaging hole formed in the valve body 31 in a state that the engaging protrusions 31a and 31a are engaged with the engaging holes 21b and 21b (see FIG. 3).

Figure 9:
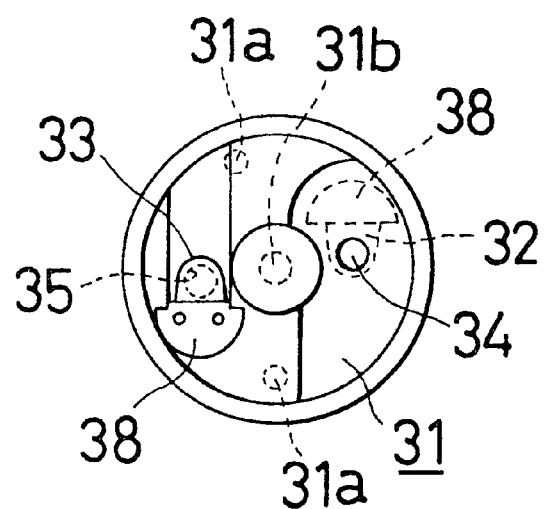
FIG. 9 is a front view of a valve body.

As shown in FIG. 9, the valve body 31 is provided with an outlet opening 34 and an inlet opening 35 at both sides of the central engaging hole 31b. An outlet valve 32 made of elastic material is disposed on the outlet opening 34 at the diaphragm connecting portion 21 side and is fixed to the valve body 31 at the basal end thereof by a fixing member 38, as shown in FIGS. 5 and 9. In accordance with the compression of the diaphragm 4, the outlet valve 32 moves toward the diaphragm connecting portion 21 to open the outlet opening 34, whereby the air or water in the diaphragm 4 is forwarded to the outlet port 25 through the outlet opening 34. Thus, the air or water is sent to the outlet side chamber 12 through the outlet port 25. Thereafter, the air or water is sent out of the pump casing 9 through the outlet pipe 14 and an outlet 64.

On the other hand, an inlet valve 33 made of elastic material is disposed on the inlet opening 35 at the diaphragm 4 side and is fixed to the valve body 31 at the basal end thereof by a fixing member 38, as shown in FIGS. 5 and 9. In accordance with the expansion of the diaphragm 4, the inlet valve 33 moves toward the diaphragm 4 to open the inlet opening 35, whereby the air or water is introduced into the diaphragm 4 through the inlet opening 35. Thus, the air or water is introduced into the inlet side chamber 11 through the inner pipe 13. Thereafter, the air or water is introduced into the diaphragm 4 via the inlet port 24 and the inlet opening 35.

As shown in FIGS. 2 and 5, the pump casing 9 is provided with a hooking portion 9c for fixing the basal end portion of the vibration arm 3 at a portion near the protruded portion 15. The basal end portion of the vibration arm 3 is fixed to the hooking portion 9c, and the longitudinal central portion of the vibration arm 3 is connected to the top end of the diaphragm 4. In addition, a permanent magnet piece 6 is attached to the free-end of the vibration arm 3. The permanent magnet piece 6 is located so as to closely oppose the core 2a of the electromagnet 2.

When an alternating current passes through the electromagnet 2, the permanent magnet piece 6 begins to reciprocate in the direction of the arrows shown in FIG. 2 in accordance with the alternative electromagnetic fields of the electromagnet 2. This causes reciprocative movement of the vibration arm 3, which in turn causes a repetition of expansion and compression of the diaphragm 4.

When the diaphragm 4 is compressed, the outlet valve 32 moves to open the outlet opening 34 and the inlet valve 33 remains in place to close the inlet opening 35, whereby the air or water in the diaphragm 4 is forwarded to the outlet port 25 through the outlet opening 34. Thereafter, the air or water is sent out of the pump casing 5 through the outlet side chamber 12, the outlet pipe 14 and an outlet 64. On the other hand, when the diaphragm 4 is expanded, the inlet valve 33 moves to open the inlet opening 35 and the outlet valve 32 remains in place to close the outlet opening 34, whereby the air or water is introduced into the diaphragm 4 in accordance with the expansion of the diaphragm 4. Thus, the air or water is introduced into the pump casing 5 through the inlet 63, and then into the inlet side chamber 11 through the inner pipe 13, the inlet side chamber 11, the inlet port 24, and the inlet opening 35—in this order. Thus, in accordance with the repeated expansion and compression of the diaphragm 4, air or water is repeatedly introduced into and sent out of the pump casing 9, resulting in a continuous air or water supply to the outside through the outlet 64.

Accordingly, it is possible to circulate water contained in the aquarium in such a state that one end of a tube is connected to the outlet 64 and the other end thereof is disposed above or in the aquarium water, and one end of another tube is connected to the inlet 63 and the other end thereof is disposed in the aquarium water.

During the operation of the aquarium pump, knocking-noise, which is generally generated when the inlet valve 32 and the outlet valve 33 hit on the valve body 31 in accordance with the expansion and the compression of the diaphragm 4, is effectively eliminated because the passage of the pump casing 9, including the inlet valve 32, the outlet valve 33, the valve body 31 and the diaphragm 4, is filled with water. Thus, the pump generates almost no noise during operation.

(Second Embodiment)

Next, the second embodiment of the present invention will be explained with reference to FIGS. 10 to 20.

Figure 11:
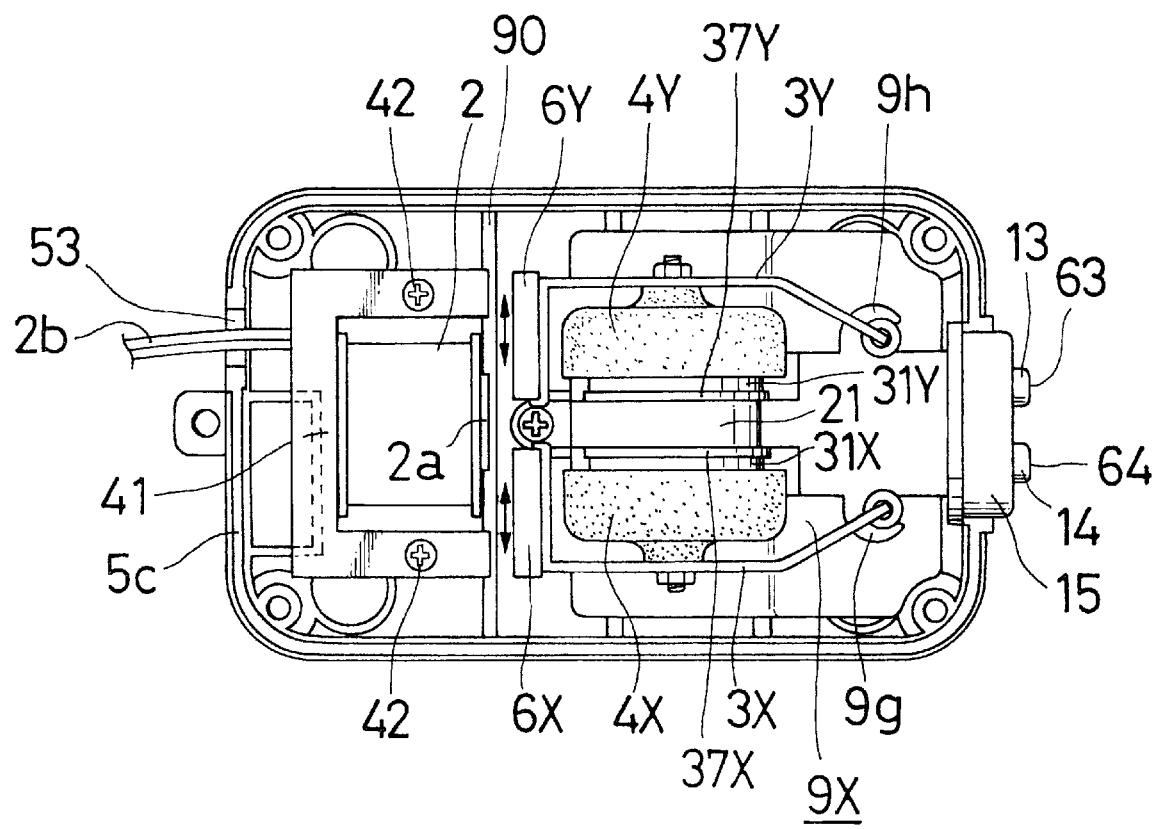
FIG. 11 is a top view of the aquarium pump shown FIG. 10 in a state in which the upper outer casing is removed.
Figure 12:
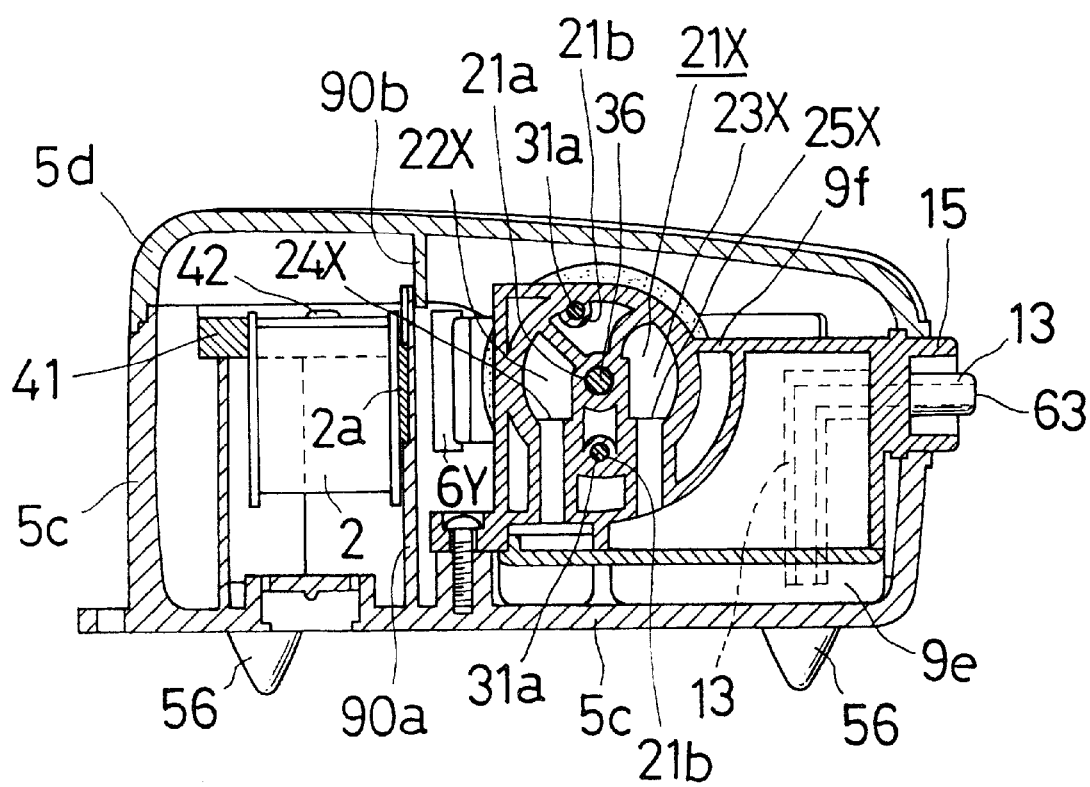
FIG. 12 is a cross-sectional view taken along the lines D—D in FIG. 10B.
Figure 13:
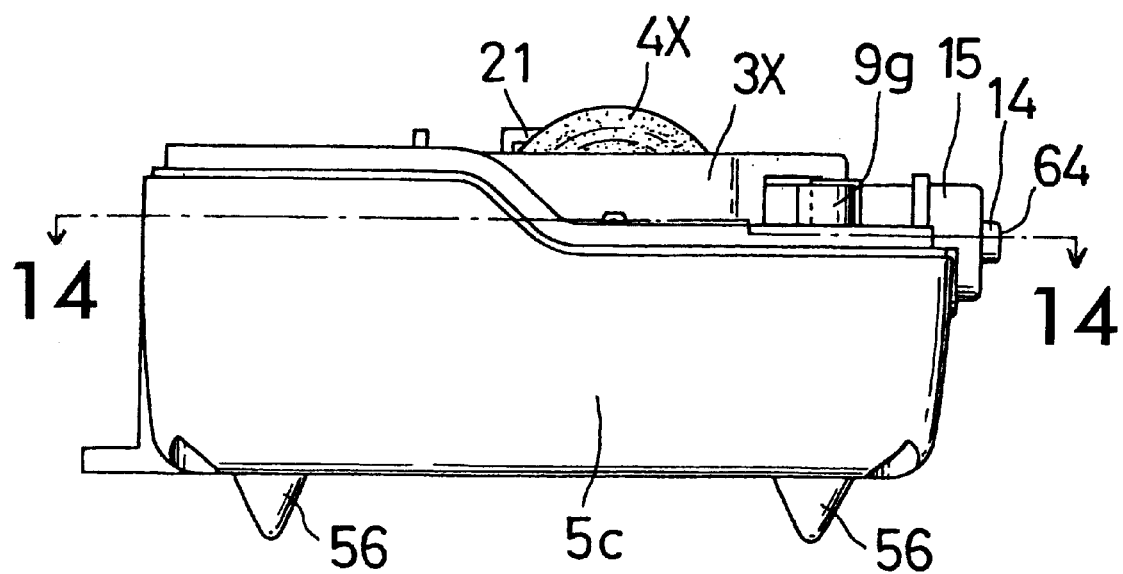
FIG. 13 is a front view of the aquarium pump shown in FIG. 10 in a state in which the upper outer casing is removed.

As shown in FIGS. 11 and 12, in an aquarium pump 1 of the second embodiment, a water-sealing partition 90 is disposed between an electromagnet 2 and a pump casing 9X so that the inside space of the outer casing 5 is partitioned in a water-sealed manner into two independent spaces, i.e., the space in which the electromagnet 2 is disposed and the space in which the pump casing 9X and diaphragms 4X and 4Y, etc. are disposed. Two inlet passages extends from an inlet 63. Each of the two inlet passages communicates with diaphragms 4X and 4Y, respectively. Each of the diaphragms 4X and 4Y communicates with each of the two outlet passages. The two outlet passages are joined and communicated with an outlet 64. Further, two valve bodies 31X and 31Y are attached to the corresponding diaphragms 4X and 4Y. Each of the valve bodies 31X and 31Y is provided with two outlet valves and two inlet valves, respectively. This structure will now be explained in detail. To avoid repetition, structure that is the same as in the aforementioned first embodiment will be explained briefly or will be omitted.

Figure 10A:
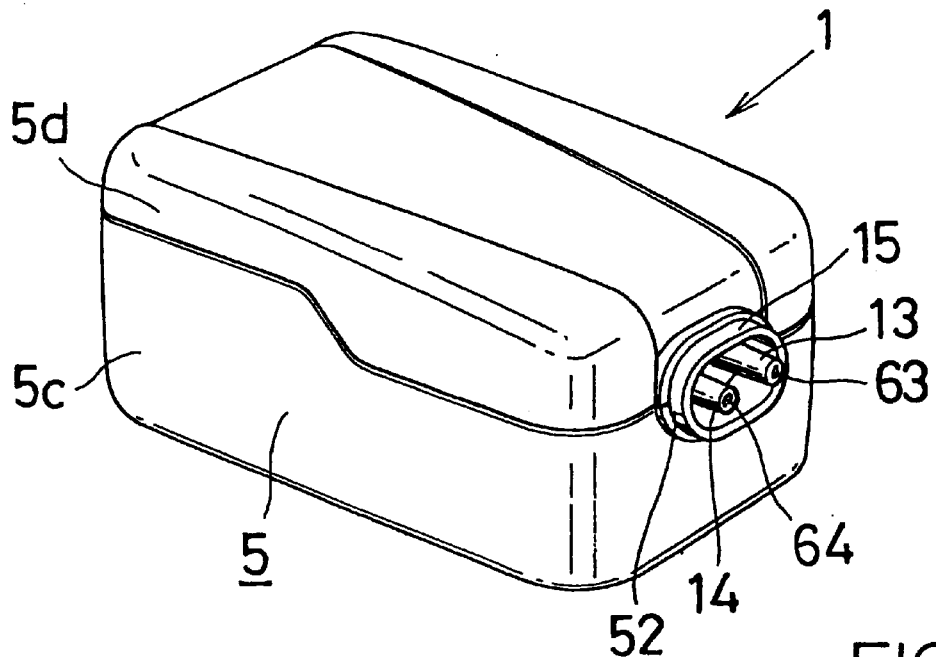
FIG. 10A is a perspective view thereof and FIG. 10B is a top view thereof.
Figure 10B:
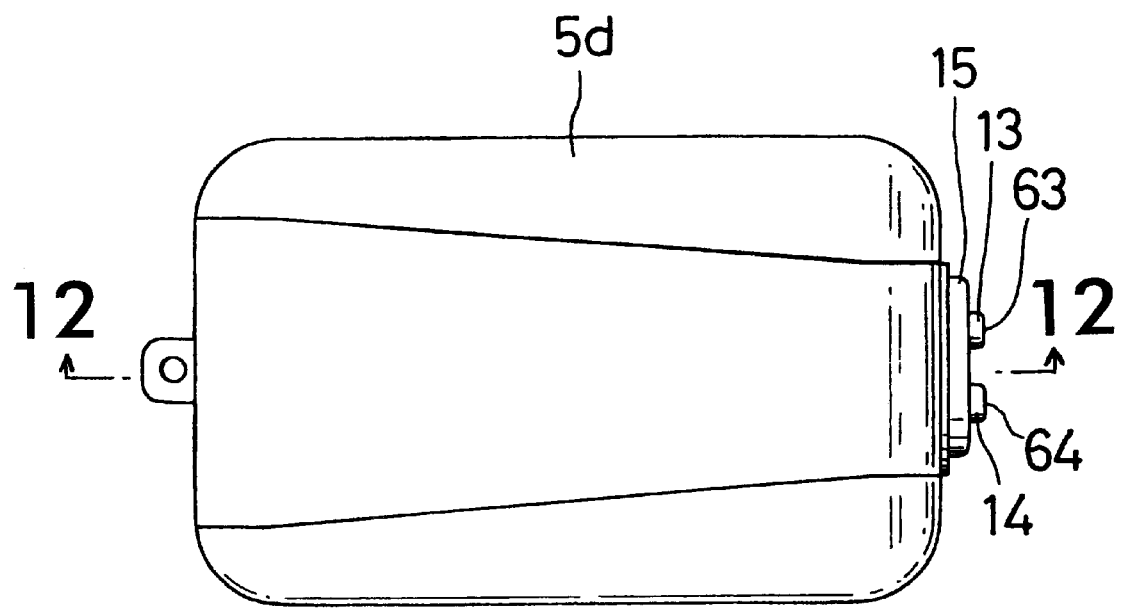

Like the aforementioned first embodiment, as shown in FIG. 10, the aquarium pump 1 is of a generally rectangular box shape, and an outer casing 5 includes a lower outer casing 5c with an opened upper end and an upper outer casing 5d with a closed top wall and an opened lower end. The upper outer casing 5d is fitted onto the lower outer casing 5c in air-tight manner. In the outer casing 5, provided at the same position as in the aforementioned first embodiment, are a first opening 52 for fitting a protruded portion 15, a second opening 53 for fitting an electric cord 2b, and generally cone-shaped hollow supporting legs 56. Furthermore, in the outer casing 5, an electromagnet 2 is fixed at the same position and in the same manner as in the aforementioned first embodiment, and a pump casing 9X is fixed at the same position as in the aforementioned first embodiment. The structure of the pump casing 9X is different from that of the pump casing of the aforementioned first embodiment.

As shown in FIG. 12, a first water-sealing partition 90a protrudes upwardly from the bottom wall of the lower outer casing 5c at the position between the electromagnet 2 and the pump casing 9X. A second water-sealing partition 90b protrudes downwardly from the top wall of the upper outer casing 5d at the position between the electromagnet 2 and the pump casing 9X. In a state in which the upper outer casing 5d is tightly fitted on the lower outer casing 5c, the upper end of the first water-sealing partition 90a and the lower end of the second water-sealing partition 90b are coupled with each other to form a water-sealing partition 90. In this structure, the space in which the electromagnet 2 is disposed and the space in which the pump casing 9X and the diaphragms 4X and 4Y are disposed are separated in a water-sealed manner. Accordingly, even though water leaks from the pump casing 9X into the outer casing 5, water is prevented from entering into the space in which the electromagnet 2 is disposed by virtue of the water-sealing partition 90. Therefore, trouble such as electrical leakage can be avoided. Accordingly, a very safe aquarium pump can be provided. Also, the maintenance of the aquarium pump can be performed easily because the upper outer casing 5d can be removed from the lower outer casing 5c so as to dispose the electromagnet 2, the pump casing 9X and the diaphragms 4X and 4Y.

The pump casing 9X has an inner space divided into an inlet side chamber 11 and an outlet side chamber 12. As shown in FIG. 15 to 18, the pump casing 9X includes a shallow dish-shaped lower basal pump casing 9e with an opened upper end and an upper main pump casing 9f fluid-tightly fitted on the lower basal pump casing 9e. Both the upper and lower pump casings 9e and 9f are synthetic molded articles.

Figure 17:
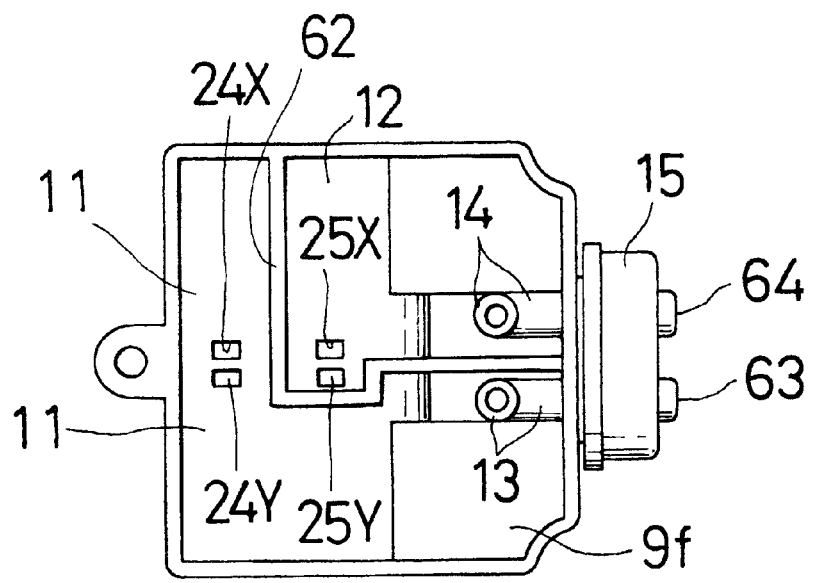
FIG. 17 is a bottom view of the upper main pump casing of the pump casing shown in FIG. 15.
Figure 18:
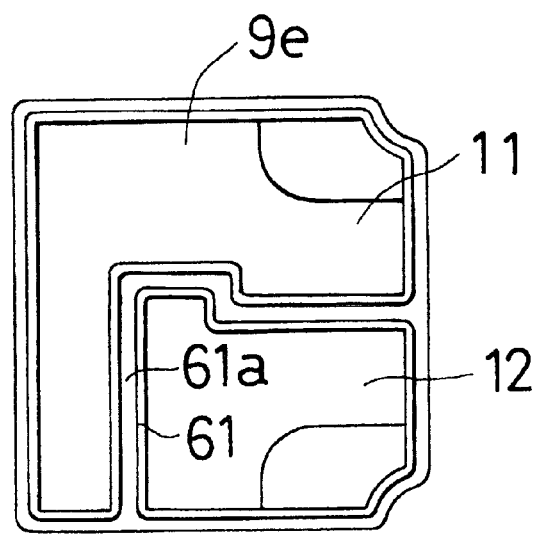
FIG. 18 is a top view of the lower basal pump casing of the pump casing shown in FIG. 15.

As shown in FIG. 18, the lower basal pump casing 9e has, at its upper surface, an upwardly protruding generally L-shaped lower partition 61 for partitioning the inside space into the inlet side chamber 11 and the outlet side chamber 12. Along the upper edge of the lower partition 61, a groove 61a is formed. As shown in FIG. 17, the upper main pump casing 9f has a downwardly protruding generally L-shaped upper partition 62 for partitioning the inside space into the inlet side chamber 11 and the outlet side chamber 12. The upper main casing 9f is fitted on the lower basal pump casing 9e, and the lower end of the upper partition 62 is fluid-tightly fitted in the groove 61a of the lower partition 61, whereby the inside space of the pump casing 9 is fluid-tightly divided into two independent chambers 11 and 12, i.e., the inlet side chamber 11 and the outlet side chamber 12.

Figure 15:
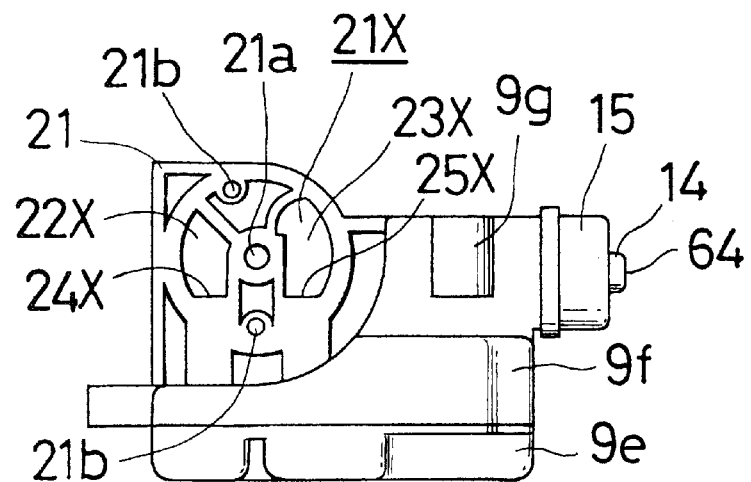
FIG. 15 is a front view of the pump casing of the aquarium pump shown in FIG. 10.
Figure 16:
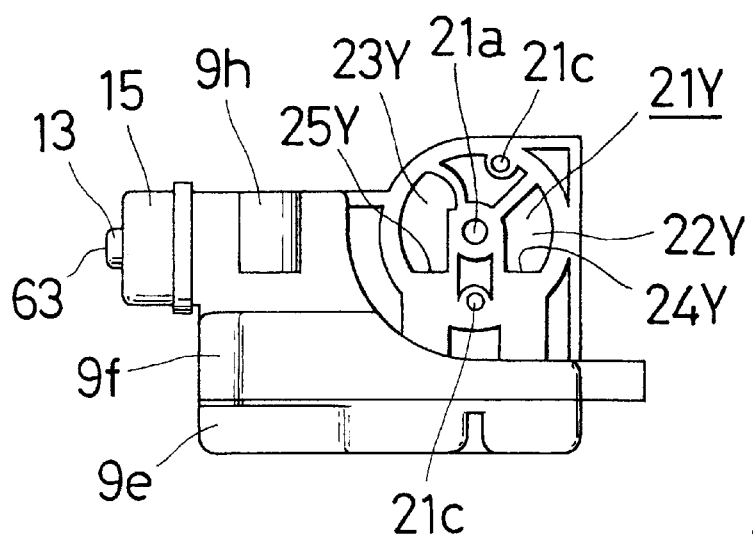
FIG. 16 is a rear view of the pump casing of the aquarium pump shown in FIG. 10.

As shown in FIGS. 15 to 17, at the upper portion of the side surface of the upper main pump casing 9f, a protruding portion 15 is formed. At the central portion of the protruding portion 15, an inlet pipe 13 and an outlet pipe 14 are disposed in parallel. The inlet pipe 13 extends into the inlet side chamber 11, bends downwardly to have an opened end in the inlet side chamber 11. Similarly, the outlet pipe 14 extends into the outlet side chamber 12, and bends downwardly to have an opened end in the outlet side chamber 12.

As shown in FIGS. 15 and 16, a vertical plate-shaped diaphragm connecting portion 21 is integrally formed to the upper main pump casing 9f. The diaphragm connecting portion 21 has a first connecting surface 21X at its front side and a second connecting surface 21Y at its rear side. At the center of the first connecting surface 21X, a penetrated bolt-insertion hole 21a for fixing a valve body is provided. At the opposing edge portions of the first connecting surface 21X, engaging holes 21b and 21b are formed for fixing the first valve body 31X and for preventing the first valve body 31X from rotating on the diaphragm connecting portion 21. At both sides of the bolt-insertion hole 21a, i.e., the right and left sides of the bolt-insertion hole 21a, a first inlet dented portion 22X and a first outlet dented portion 23X are formed. The first inlet dented portion 22X is in communication with the inlet side chamber 11 by way of a first inlet port 24X formed in the bottom wall of the first inlet dented portion 22X. The first outlet dented portion 23X is in communication with the outlet side chamber 12 by way of a first outlet port 25X formed in the bottom wall of the first outlet dented portion 23X.

On the other hand, as shown in FIG. 16, at the opposing edge portions of the second connecting surface 21Y, engaging holes 21c and 21c are formed for positioning the second valve body 31Y and for preventing the second valve body 31Y from rotating on the diaphragm connecting portion 21. At both sides of the bolt-insertion hole 21a, i.e., the right and left sides of the bolt-insertion hole 21a, a second inlet dented portion 22Y and a second outlet dented portion 23Y are formed. The second inlet dented portion 22Y is in communication with the inlet side chamber 11 by way of a second inlet port 24Y formed in the bottom wall of the second inlet dented portion 22Y. The second outlet dented portion 23Y is in communication with the outlet side chamber 12 by way of a second outlet port 25Y formed in the bottom wall of the second outlet dented portion 23Y.

Figure 14:
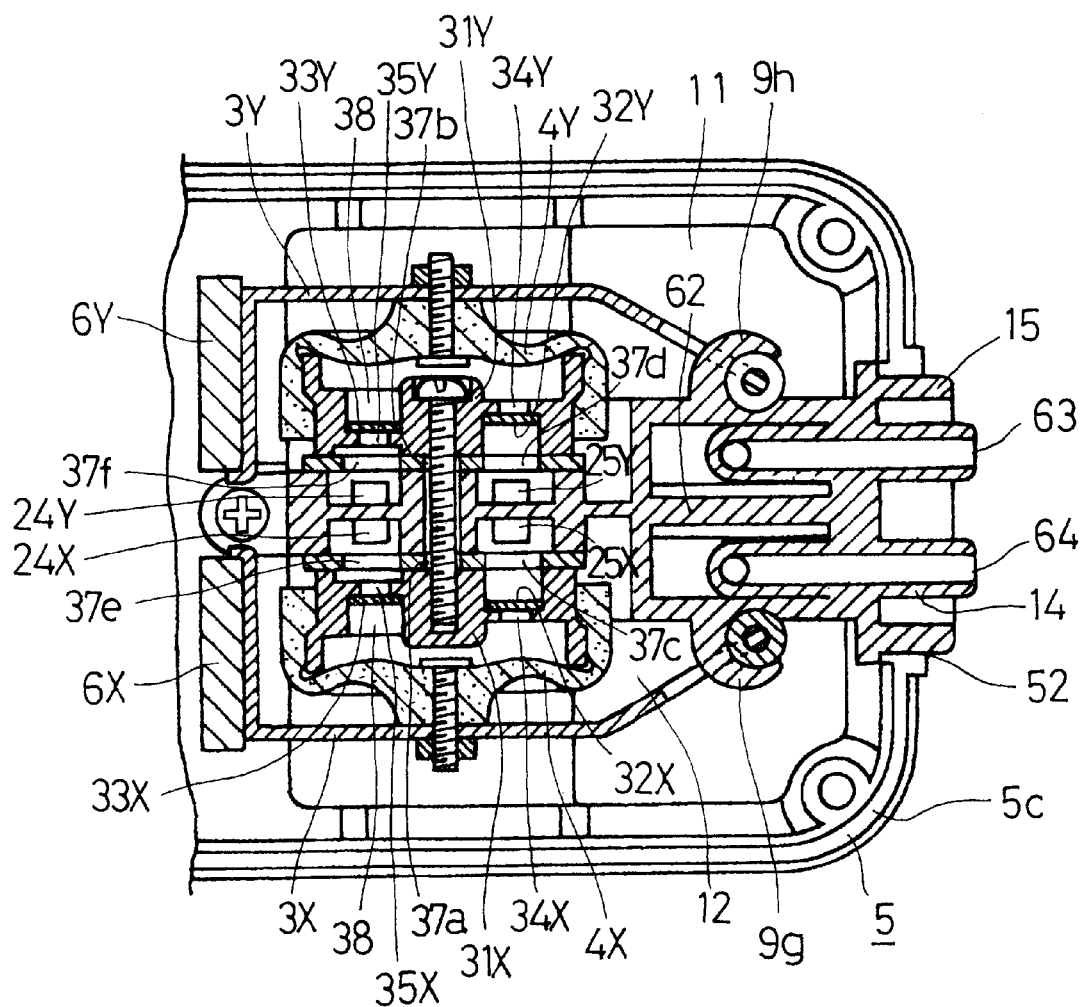
FIG. 14 is a partial cross-sectional view taken along the lines E—E in FIG. 13.

As shown in FIG. 14, a first valve body 31X is attached to the first diaphragm connecting surface 21X via a first packing 37X. Fitted on the first valve body 31X is the cup-shaped first diaphragm 4X made of rubber. Also, a second valve body 31Y is attached to the second diaphragm connecting surface 21Y via a second packing 37Y. Fitted on the second valve body 31Y is the cup-shaped second diaphragm 4Y made of rubber. The first valve body 31X has a pair of engaging protrusions 31a and 31a (see FIG. 12). The engaging protrusions 31a and 31a are engaged with engaging holes 21b and 21b formed in the first connecting surface 21X. Also, the second valve body 31Y has a pair of engaging protrusions 31c and 31c. The engaging protrusions 31c and 31c are engaged with engaging holes 21c and 21c formed in the second connecting surface 21Y. Then, the first valve body 31X and the second valve body 31Y are connected to the diaphragm connecting portion 21 via the first packing 37X and the second packing 37Y by tightening a bolt 36. The bolt 36 is inserted in a bolt-insertion hole 31d of the second valve body 31Y, a bolt-insertion hole of the second packing 37Y, a bolt-insertion hole 21a of the diaphragm connecting portion, a bolt-insertion hole of the first packing 37X and a bolt-insertion hole 31b of the first valve body 31X.

Figure 19A:
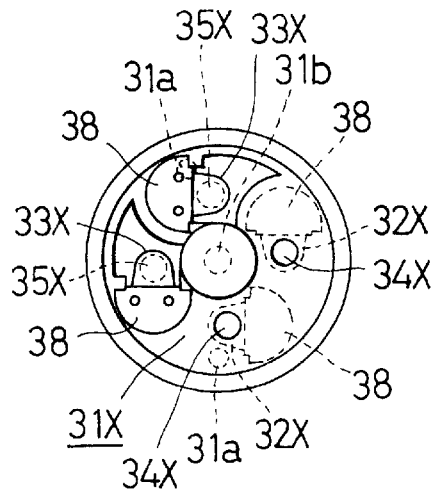
FIG. 19A is a front view thereof and FIG. 19B is a rear view thereof.
Figure 19B:
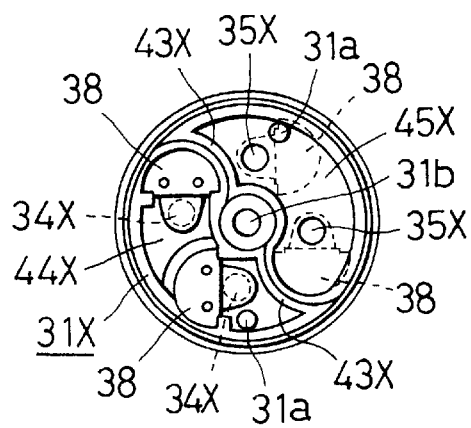

As shown in FIG. 19, the first valve body 31X is provided with a pair of outlet openings 34X and a pair of inlet openings 35X at both sides of the central engaging hole 31b. First outlet valves 32X and 32X made of elastic material are disposed on the outlet openings 34X and 34X at the diaphragm connecting portions 21 side. The first outlet valves 32X and 32X are fixed to the first valve body 31X at the basal end thereof by fixing members 38 and 38 near the outlet openings 34X and 34X. In the rear side of the first valve body 31X, as shown in FIG. 19B, a generally S-shaped first dividing wall 43X is protruded to form the first outlet dented portion 44X that communicates with the outlet openings 34X and 34X and the first inlet dented portion 45X that communicates with the inlet openings 35X and 35X. At both sides of fixing hole 37a of the first packing 37X, openings 37c and 37e are disposed. The opening 37c is opposed to the first outlet dented portion 44X and the opening 37e is opposed to the first inlet dented portion 45X. In accordance with the compression of the first diaphragm 4X, the outlet valves 32X and 32X move toward the diaphragm connecting portion 21 to open the outlet openings 34X and 34X, whereby the air or water in the diaphragm 4X is forwarded to the outlet port 25X through the outlet openings 34X and 34X, the first outlet dented portion 44X, and the opening 37c. Thus, after the air or water is sent to the outlet side chamber 12 through the first outlet port 25X, the air or water is sent out from the outlet 64 through the outlet pipe 14.

As shown in FIGS. 19A and 19B, the first inlet valves 33X and 33X made of elastic material are disposed so as to cover the inlet openings 35X and 35X at the first diaphragm 4X side. The first inlet valves 33X and 33X are fixed to the first valve body 31X at the basal end thereof by fixing members 38 and 38 near the inlet openings 35X and 35X. In accordance with the expansion of the first diaphragm 4X, the inlet valves 33X and 33X move toward the first diaphragm 4X to open the inlet openings 35X and 35X, whereby the air or water is introduced into the first diaphragm 4X through the inlet openings 35X and 35X. Thus, in accordance with the expansion of the first diaphragm 4X, the air or water is introduced into the inlet side chamber 11 through the inlet 63 and the inlet pipe 13. Thereafter, the air or water is introduced into the first diaphragm 4X through the first inlet port 24X, the opening 37e of the packing 37X, the first inlet dented portion 45X and the inlet openings 35X and 35X—in this order.

Figure 20A:
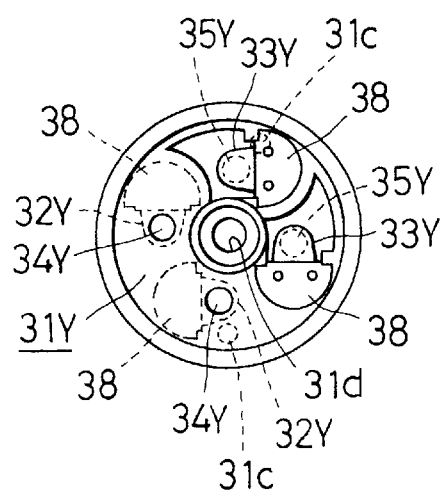
FIG. 20A is a front view thereof and FIG. 20B is a rear view thereof.
Figure 20B:
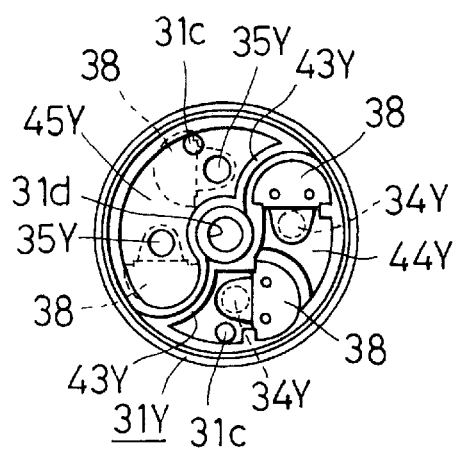

As shown in FIGS. 20A and 20B, the second valve body 31Y is provided with a pair of outlet openings 34Y and 34Y and a pair of inlet openings 35Y and 35Y at both sides of the central engaging hole 31d. Second outlet valves 32Y and 32Y made of elastic material are disposed on the outlet openings 34Y and 34Y at the diaphragm connecting portions 21 side. The second outlet valves 32Y and 32Y are fixed to the second valve body 31Y at the basal end thereof by fixing members 38 and 38 near the outlet openings 34Y and 34Y. In the rear side of the second valve body 31Y, as shown in FIG. 20B, a generally S-shaped second dividing wall 43Y protrudes so as to form the second outlet dented portion 44Y which communicates with the outlet openings 34Y and 34Y and the second inlet dented portion 45Y which communicates with the inlet openings 35Y and 35Y. At both sides of fixing hole 37b of the second packing 37Y, openings 37d and 37f are provided. The opening 37d is opposed to the second outlet dented portion 44Y, and the opening 37f is opposed to the second inlet dented portion 45Y. In accordance with the compression of the second diaphragm 4Y, the outlet valves 32Y and 32Y move toward the diaphragm connecting portion 21 to open the outlet openings 34Y and 34Y, whereby the air or water in the diaphragm 4Y is forwarded to the outlet port 25Y through the outlet openings 34Y and 34Y, the second outlet dented portion 44Y, and the opening 37d. Thus, after the air or water is sent to the outlet side chamber 12 through the second outlet port 25Y, the air or water is sent out from the outlet 64 through the outlet pipe 14.

Also, the second inlet valves 33Y and 33Y made of elastic material are disposed so as to cover the inlet openings 35Y and 35Y at the second diaphragm 4Y side. The second inlet valves 33Y and 33Y are fixed to the second valve body 31Y at the basal end thereof by fixing members 38 and 38 near the inlet openings 35Y and 35Y. In accordance with the expansion of the second diaphragm 4Y, the inlet valves 33Y and 33Y move toward the second diaphragm 4Y to open the inlet openings 35Y and 35Y, whereby the air or water is introduced into the second diaphragm 4Y through the inlet openings 35Y and 35Y. Thus, in accordance with the expansion of the second diaphragm 4Y, the air or water is introduced into the inlet side chamber 11 through the inlet 63 and the inlet pipe 13. Thereafter, the air or water is introduced into the second diaphragm 4Y through the second inlet port 24Y, the opening 37f of the packing 37Y, the second inlet dented portion 45Y, and the inlet openings 35Y and 35Y—in this order.

As shown in FIGS. 11 and 14, the pump casing 9X is provided with hooking portions 9g and 9h for fixing the basal end portion of the first and second vibration arms 3X and 3Y at a portion near the protruded portion 15. The basal end portion of the first vibration arm 3X is fixed to the hooking portion 9g, and the longitudinal central portion of the first vibration arm 3X is connected to the top end of the first diaphragm 4X. In addition, a permanent magnet piece 6X is attached to the free-end of the first vibration arm 3X. The permanent magnet piece 6X is located so as to closely oppose the core 2a of the electromagnet 2. Similarly, the basal end portion of the second vibration arm 3Y is fixed to the hooking portion 9h, and the longitudinal central portion of the second vibration arm 3Y is connected to the tip end of the second diaphragm 4Y. In addition, a permanent magnet piece 6Y is attached to the free-end of the second vibration arm 3Y. The permanent magnet piece 6Y is located so as to closely oppose the core 2a of the electromagnet 2.

When an alternating current passes through the electromagnet 2, the permanent magnet pieces 6X and 6Y begin to reciprocate in the direction of arrows shown in FIG. 11 in accordance with the alternative electromagnetic fields of the electromagnet 2. This causes reciprocative movement of the two vibration arms 3X and 3Y, which in turn causes a repetition of expansion and compression of the two diaphragms 4X and 4Y.

When the first diaphragm 4X is compressed, the first outlet valves 32X and 32X open and the first inlet valves 33X and 33X close, and then air or water in the first diaphragm 4X is sent out through the outlet openings 34X and 34X. Thereafter, the air or water is sent out through the outlet 64 via the first outlet dented portion 44X, the opening 37c of the packing 37Y, the first outlet port 25X, the outlet side chamber 12 and the outlet pipe 14. When the second diaphragm 4Y is compressed, the second outlet valves 32Y and 32Y open and the second inlet valves 33Y and 33Y close, and then air or water in the second diaphragm 4Y is sent out through the outlet openings 34Y and 34Y. Thereafter, the air or water is sent to the inlet side chamber 12 in which the air or water is mixed with the air or water sent out from the first diaphragm 4X. Then, the air or water is sent out from the outlet 64 via the outlet pipe 14.

When the first diaphragm 4X is expanded, the first outlet valves 32X and 32X close and the first inlet valves 33X and 33X open, and then air or water in the first diaphragm 4X is introduced into the pump casing via the inlet 63. Thereafter, the air or water is introduced into the first diaphragm 4X through the inlet pipe 13, the inlet side chamber 11, the first inlet port 24X, the opening 37e of the packing 37Y, the first inlet dented portion 45X, and the inlet openings 35X and 35X—in this order. When the second diaphragm 4Y is expanded, the second outlet valves 32Y and 32Y close and the second inlet valves 33Y and 33Y open, and then air or water is introduced into the pump casing from the inlet 63. Thereafter, the air or water is introduced into the second diaphragm 4Y through the inlet pipe 13, the inlet side chamber 11, the second inlet port 24Y, the opening 37f of the packing 37Y, the second inlet dented portion 45Y, and the inlet openings 35Y and 35Y—in this order.

In accordance with the repetition of compression and expansion of the first diaphragm 4X and the second diaphragm 4Y, air or water is repeatedly sent out and introduced. Thus, air or water is continuously forwarded outside through the outlet 64. For example, when the pump is connected to an aquarium, as in the same manner of the first embodiment, the water filled in the aquarium can be circulated. At this time, by the same effect as in the aforementioned first embodiment, the pump generates almost no noise during operation.

Two inlet passages extend from the inlet 63. Each of the two inlet passages communicates with the diaphragms 4X and 4Y, respectively. Each of the diaphragms 4X and 4Y communicates with each of the two outlet passages. The two outlet passages are joined and communicates with the outlet 64. As mentioned above, since the two diaphragms 4X and 4Y are used in this embodiment, the pumping ability can be increased.

According to the aforementioned second embodiment, two outlet valves and two inlet valves are provided on the two valve bodies 31X and 31Y in correspondence to the diaphragms 4X and 4Y, respectively. On the other hand, in the first embodiment, one inlet valve is provided on one valve body. In the latter case, since the inlet valve slightly opens and the opening angle of the inlet valve is limited due to the water resistance, the pumping ability is not as large. Although the pumping ability of the first embodiment is sufficient for a general aquarium, it may not be sufficient for a larger aquarium. In the second embodiment, since a plurality of inlet valves are provided for one diaphragm, the pumping ability can be increased. Furthermore, since a plurality of outlet valves are disposed on one diaphragm, the pumping ability can be increased significantly.

According to the second embodiment, two inlet valves and two outlet valves are provided for one diaphragm. However, three or more inlet and outlet valves can be provided for one diaphragm. Similarly, three or more diaphragms may be used.

Figure 21A:
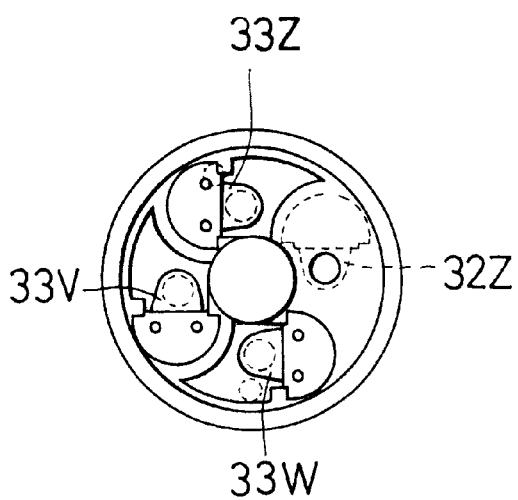
FIG. 21A is a front view thereof.
Figure 21B:
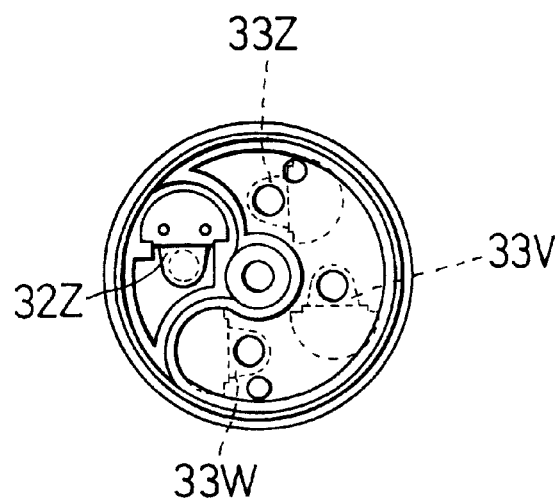
FIG. 21B is a rear view thereof.

FIGS. 21A and 21B illustrate another example in which three inlet valves are provided for one diaphragm. Three inlet valves 33Z, 33V and 33W are provided on a valve body and one outlet valve 32Z is provided. When this valve body is used as a valve body of the aforementioned second embodiment, the same effect as in the second embodiment can be obtained.

(First Embodiment Of An Aquarium Apparatus)

Next, an embodiment of an aquarium apparatus equipped with a passage aquarium will be explained with reference to the drawings.

Figure 22:
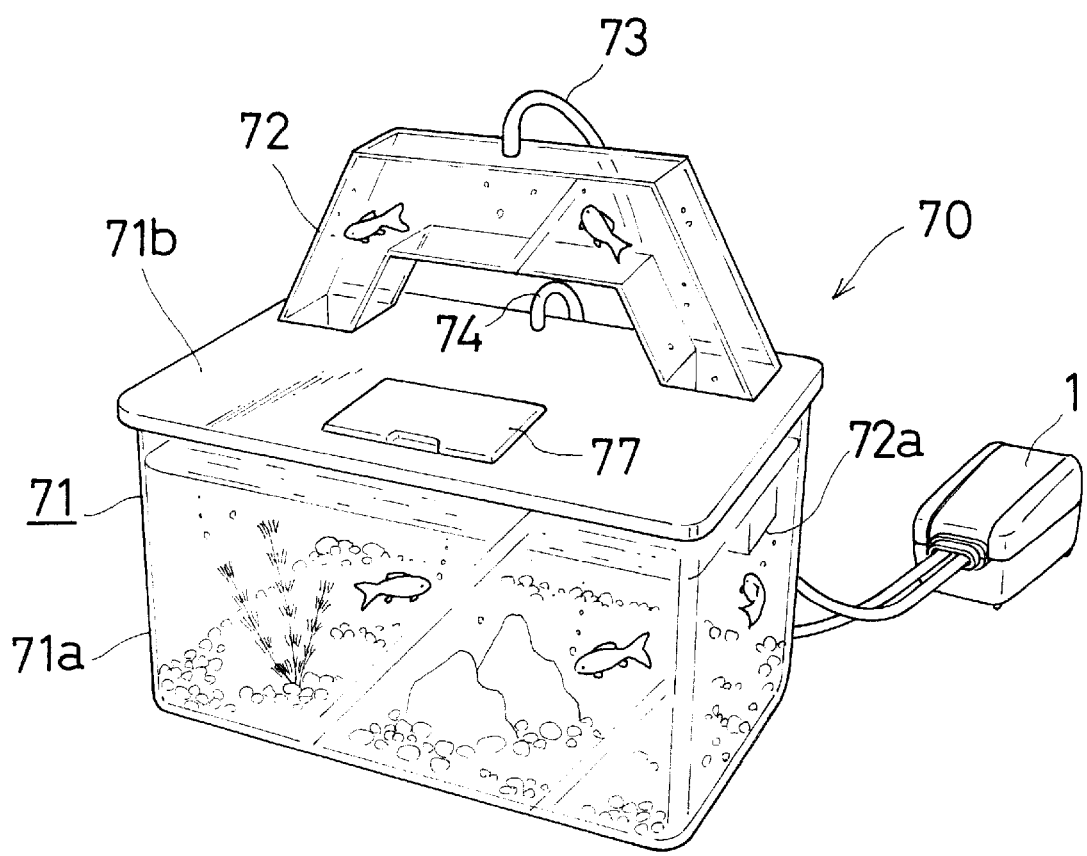
FIG. 22 is a perspective view of an aquarium apparatus equipped with a passage aquarium according to an embodiment of the present invention.
Figure 23:
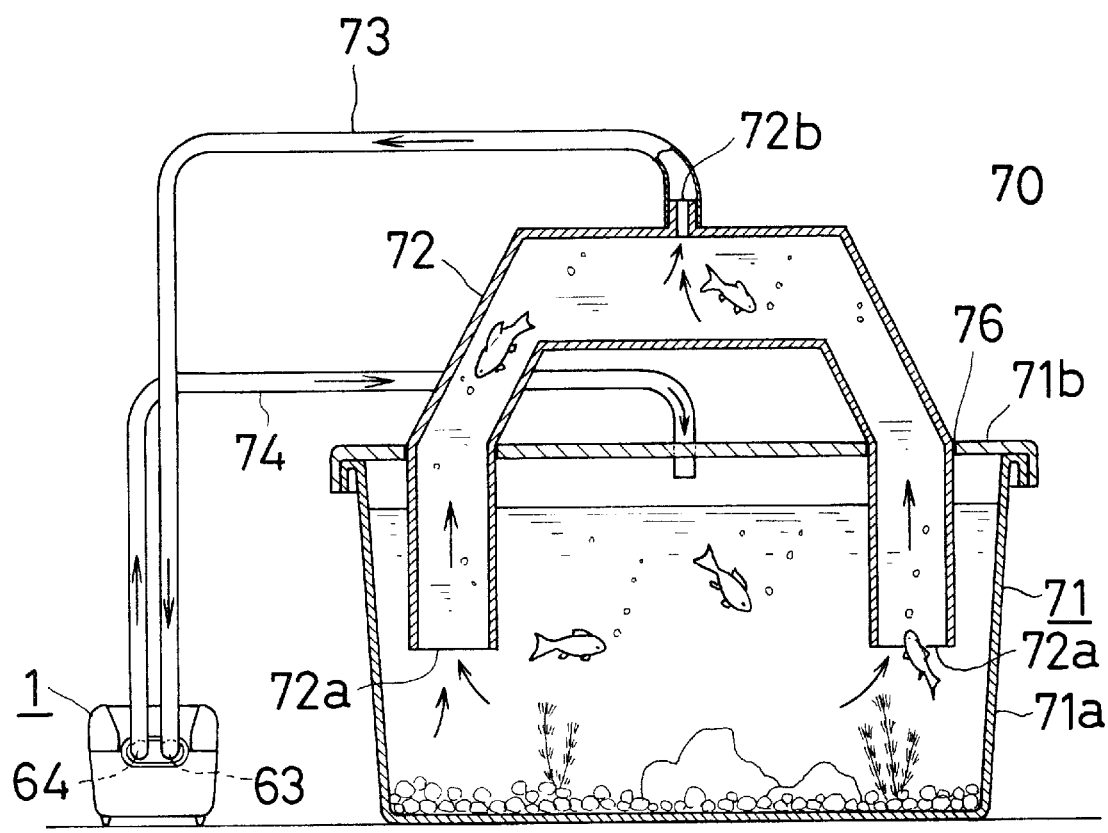
FIG. 23 is a cross-sectional view of the aquarium apparatus equipped with a passage aquarium shown in FIG. 22.
Figure 24:
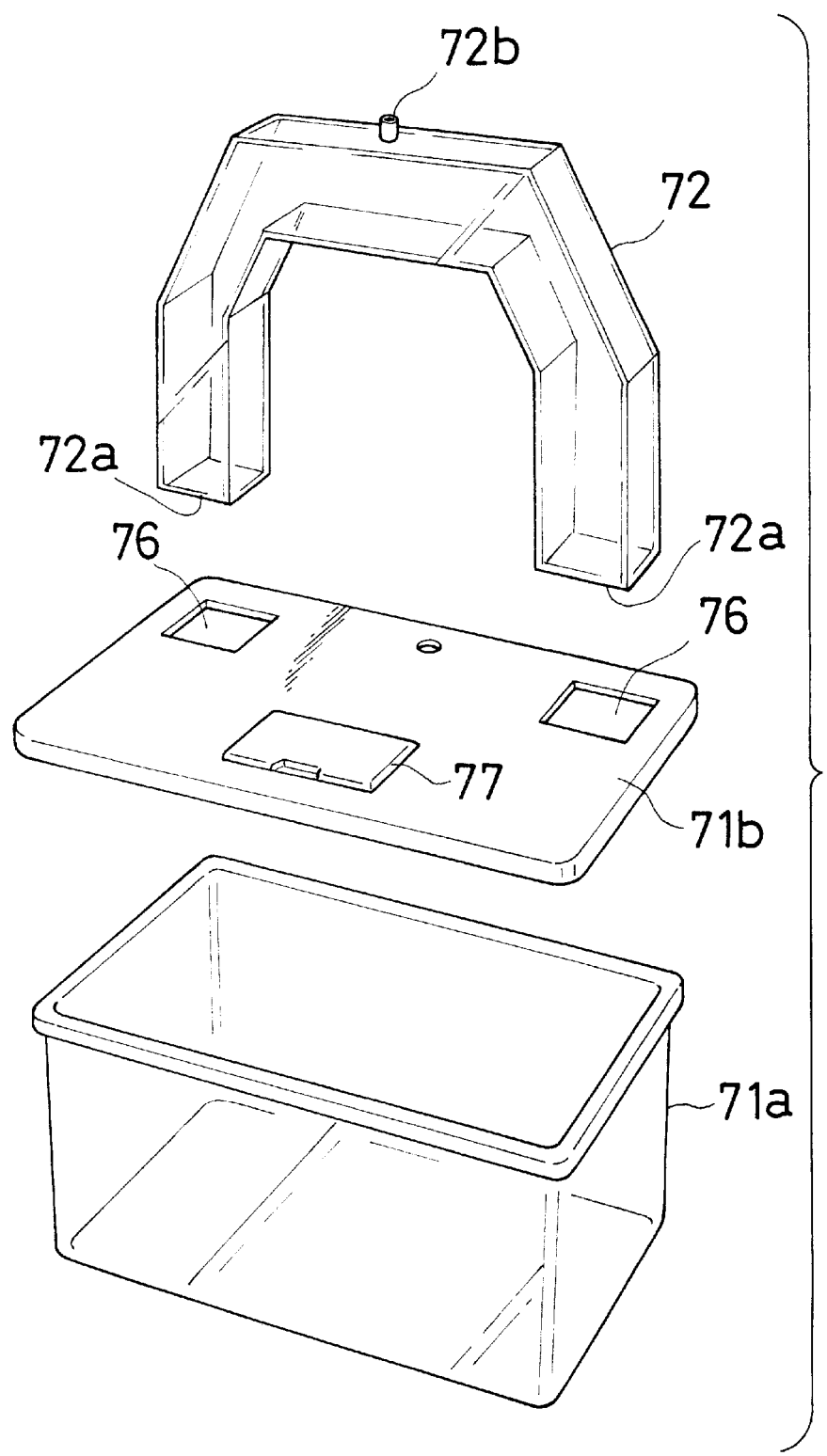
FIG. 24 is a perspective exploded view of the aquarium apparatus shown in FIG. 22.

As shown in FIGS. 22 to 24, the aquarium apparatus 70 includes a main aquarium 71, a passage aquarium 72, the aforementioned aquarium pump 1, an outlet tube 73 and an inlet tube 74.

The main aquarium 71 is preferably of a generally rectangular box shape. The main aquarium 71 includes a main aquarium body 71a and a main aquarium cover 71b fitted on an upper end of the main aquarium body 71a. Provided at the left and right rear sides of the cover 71b are openings 76 and 76 for fitting leg portions of the passage aquarium 72. Also, an openable lid 77 is provided at the central front portion of the cover 71b.

The passage aquarium 72 is an inverted generally U-shaped rectangular pipe having end openings 72a and 72a at both lower ends thereof for allowing fish to pass therethrough. An upwardly protruding cylindrical outlet 72b is provided on the top portion of the passage aquarium 72.

The aquarium cover 71b is fitted on the top of the main aquarium body 71a. Both of the leg portions of the passage aquarium 72 are fitted in the openings 76 and 76. The end openings 72a and 72a of both of the leg portions are disposed in the main aquarium body 71a. One end of the outlet tube 73, which is preferably made of resin, is connected to the cylindrical outlet 72b of the passage aquarium 72 in fluid communication, and the other end of the outlet tube 73 is connected to the inlet 63 of the aquarium pump 1 in fluid communication. Furthermore, one end of the inlet tube 74, which is preferably made of resin, is connected to the inlet 64 of the aquarium pump 1 in fluid communication, and the other end is disposed above the main aquarium 71.

First, water is filled in the main aquarium 71 such that the end openings 72a and 72a of the passage aquarium 72 are disposed within the water. Then, the aquarium pump 1 is activated by passing an alternative current through the electromagnet 2. As a result, the air confined within the passage aquarium 72 is sucked out through the cylindrical outlet 72b, resulting in an introduction of the water of the main aquarium 71 into the passage aquarium 72. Accordingly, the passage aquarium 72 is filled with water. Then, the water is sent out through the cylindrical outlet 72b to cause the water in the passage aquarium to be returned to the main aquarium 71 via the outlet tube 73, the aquarium pump 1 and the inlet tube 74. Therefore, the water in the main aquarium 71 and the passage aquarium 72 can be regularly circulated. Thus, an initial operation for discharging the air in the passage aquarium 72 and for continuous circulation of the water can easily be performed by simply activating the aquarium pump 1.

Since the suction of the aquarium pump 1 acts on the cylindrical outlet 72b provided at the top portion of the passage aquarium 72 and directly pumps out the water in the passage aquarium 72, the water in the passage aquarium 72 flows effectively. Therefore, this system prevents fish from dying in the passage aquarium 72 due to the stagnation and spoiling of water therein.

(Second Embodiment Of The Aquarium Apparatus)

Next, another embodiment of an aquarium apparatus equipped with a passage aquarium according to the present invention will be explained with reference to the drawings.

Figure 25:
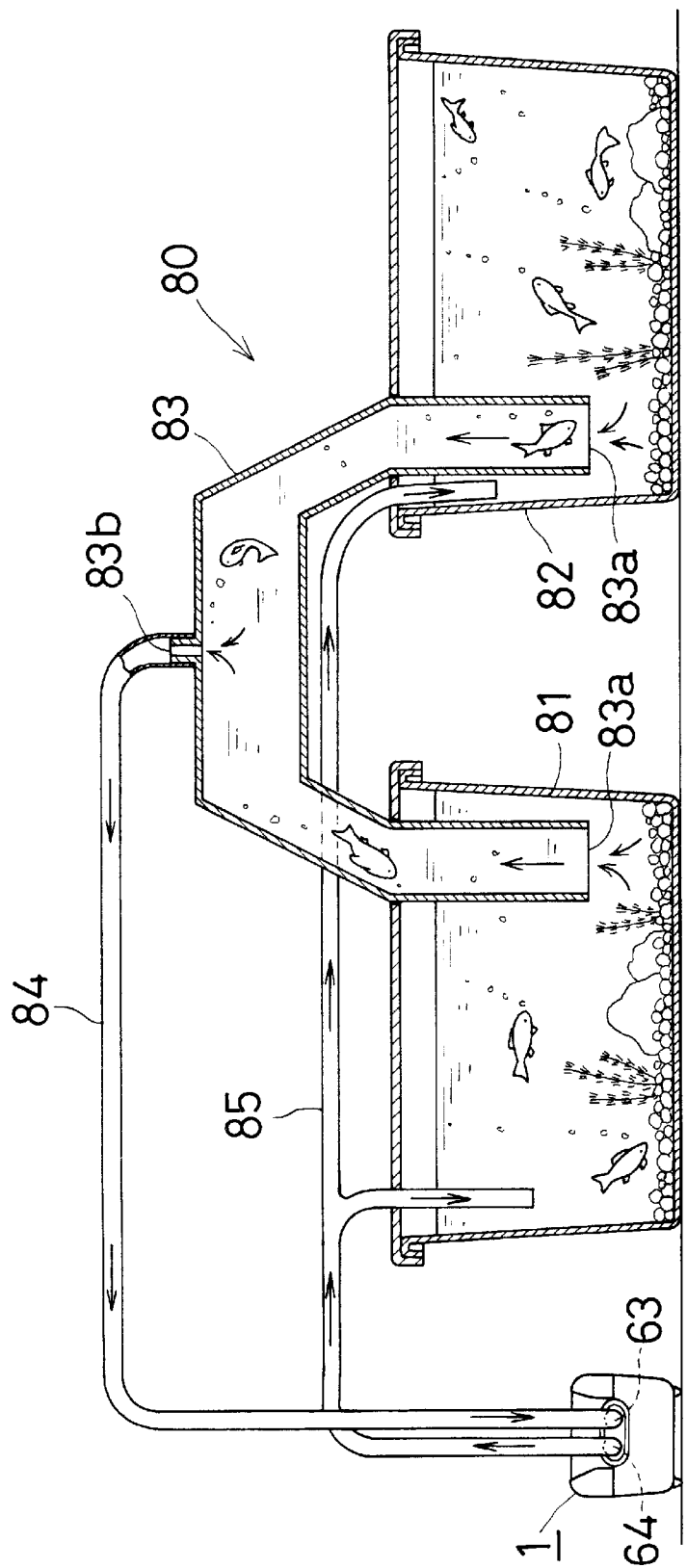
FIG. 25 is a perspective view of an aquarium apparatus equipped with a passage aquarium according to another embodiment of the present invention.
Figure 26:
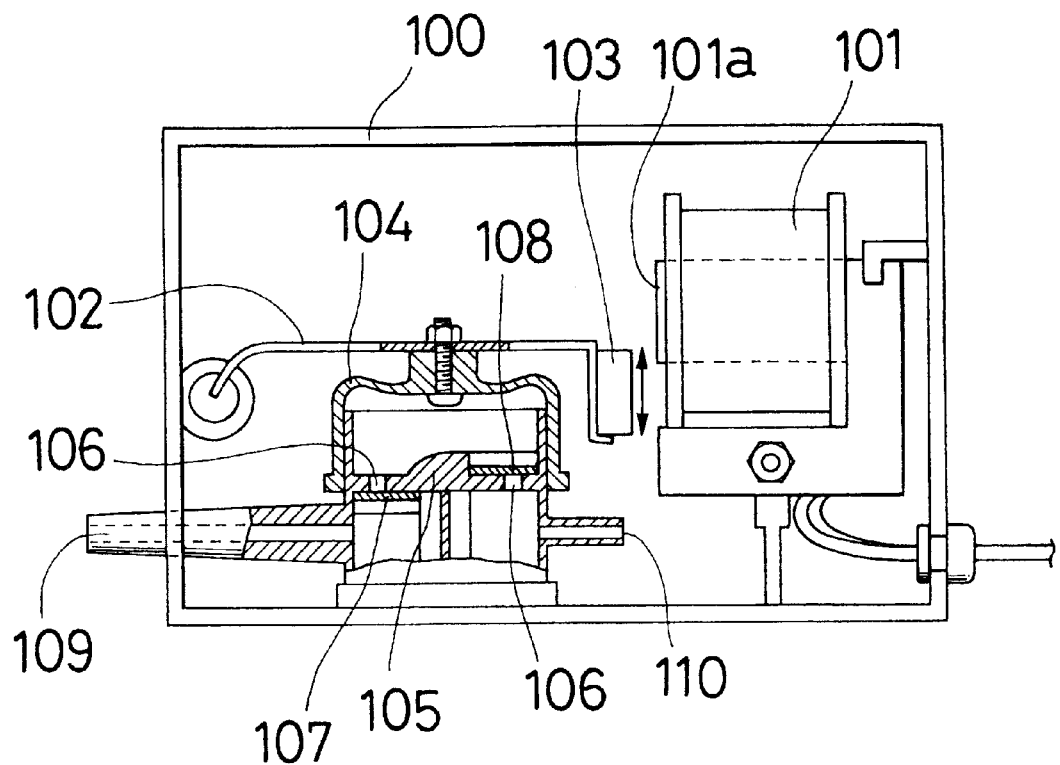
FIG. 26 is a cross-sectional view of a conventional air pump.

As shown in FIG. 25, an aquarium apparatus 80 includes a first main aquarium 81, a second main aquarium 82, a passage aquarium 83, the aforementioned aquarium pump 1 for use both as an air pump and a water pump, an outlet tube 84 and an inlet tube 85.

The passage aquarium 83 is an inverted generally U-shaped pipe having end openings 83a and 83a through which fish can pass. An upwardly protruding cylindrical outlet 83b is provided on the top portion of the passage aquarium 83. The passage aquarium 83 is placed so as to bridge the first main aquarium 81 and the second main aquarium 82. In other words, the end openings 83a and 83a of the passage aquarium 83 are disposed in the first main aquarium 81 and the second main aquarium 82. One end of the outlet tube 84, e.g., made of resin, is connected to the cylindrical outlet 83b of the passage aquarium 83 in fluid communication, and the other end thereof is connected to the inlet 63 of the aquarium pump 1. Furthermore, one end of the outlet tube 85, e.g., made of resin, communicates with the outlet 64 of the aquarium pump 1 in fluid communication, and the other end thereof is diverged into two tubes, the end portions thereof being disposed, respectively, in the first and second main aquariums 81 and 82.

In a state in which water is filled in the first and second main aquariums 81 and 82 such that the end openings 83a and 83a of the passage aquarium 83 are disposed in the water, when an alternative current is passed through the electromagnet 2 of the aquarium pump 1, the air confined in the passage aquarium 83 is pumped out through the cylindrical outlet 83b to cause the water of the first and second main aquariums 81 and 82 to be introduced in the passage aquarium 83. Thus, the passage aquarium 83 can be filled with water. Thereafter, the water is pumped out through the cylindrical outlet 83b. Accordingly, the water in the passage aquarium 83 is returned or introduced into the first main aquarium 81 and the second main aquarium 82 via the outlet tube 84, the aquarium pump 1 and the inlet tube 85. Therefore, the water in the first main aquarium 81, and in the second main aquarium 82, and in the passage aquarium 83 can regularly be circulated. Thus, an initial operation for pumping out the air in the passage aquarium 83 and for continuous circulation of the water can easily be performed by simply activating the aquarium pump 1.

Since the suction of the aquarium pump 1 acts on the cylindrical outlet 83b provided at the top portion of the passage aquarium 83 and directly pumps the water in the passage aquarium 83, the water in the passage aquarium 83 flows effectively. Therefore, this system prevents fish from dying in the passage aquarium 83 because of the stagnation and spoiling of water therein.

In the aforementioned embodiment, two main aquariums are provided and a passage aquarium bridges the two main aquariums. However, the present invention is not limited to this structure. Three or more main aquariums may be provided and one or more passage aquariums may bridge the main aquariums.

EXAMPLES

Some examples of the present invention will be explained as follows.

Example 1

In an aquarium apparatus with a passage aquarium shown in FIG. 23, when the aquarium pump for use both as an air pump and a water pump according to the aforementioned first embodiment was activated (AC100V, 60 Hz), the amount of circulated water was 1.6 L/min.

Example 2

In an aquarium apparatus with a passage aquarium shown in FIG. 23, when the aquarium pump for use both as an air pump and a water pump according to the aforementioned second embodiment having one valve body with one inlet valve and one outlet valve (two diaphragms) was activated (AC100V, 60 Hz), the amount of circulated water was 3.3 L/min.

Example 3

In an aquarium apparatus with a passage aquarium shown in FIG. 23, when the aquarium pump for use both as an air pump and a water pump according to the aforementioned second embodiment was activated (AC100V, 60 Hz), the amount of circulated water was 4.6 L/min.

In an aquarium pump for use both as an air pump and a water pump according to the present invention, an inlet can be provided so as to protrude from an outer casing. By connecting one end of a tube or a pipe to the inlet, water can be pumped out easily. Since the passage from the inlet to the outlet via the diaphragm is fluidly sealed, water can be consistently forwarded without leaking. Since the diaphragm, the valve, the valve body, and the like are filled with water, noise generated in accordance with compression and expansion of a diaphragm can be eliminated effectively. Thus, a pump generates almost no noise during operation, whereby the silence of the environment can be maintained. Furthermore, since the pump utilizes compression and expansion of a diaphragm, the pump is simple in structure and can be manufactured at a low cost.

In cases where an inlet valve is provided for an inlet passage and an outlet valve is provided for an outlet passage, air or water is introduced and forwarded in accordance with the opening and closing of the valves. Thus, air or water can be consistently forwarded.

In cases where a plurality of inlet valves are provided for one diaphragm, the pumping ability of the aquarium pump can be increased significantly.

In cases where a plurality of outlet and inlet valves are provided for one diaphragm, the pumping ability of the aquarium pump can be further increased.

In cases where a plurality of inlet passages are diverged from an inlet and each of the inlet passages communicates with the respective diaphragm and a plurality of outlet passages communicates with each of the diaphragms and the outlet passages are joined and communicated with the outlet, the pumping ability of the aquarium pump can be further increased.

In cases where the space in which an electromagnet is disposed and the space in which a pump casing is disposed are water-tightly partitioned, the electromagnet can be prevented from being affected by leaked water from the pump casing even if water leaks out of the pump casing. Thus, an aquarium pump with an excellent safety can further be obtained.

In cases where a water-sealing partition is provided between an electromagnet and a water-sealed passage, the structure of a pump can be simplified, resulting in a low manufacturing cost and an enhanced safety.

In cases where an outer casing includes a lower casing with an opened upper end and a upper casing fitted on the lower casing, and a first water-sealing partition protrudes upwardly from the bottom wall of the lower casing and a second water-sealing partition protrudes downwardly from the top wall of the upper casing, and the top end of the first water-sealing partition is fitted on the top end of the second water-tight partition to form a water-sealing partition, the pump can be assembled easily, can be manufactured at a lower cost, and can have its safety enhanced. Furthermore, the maintenance of the device can be simplified.

In the aquarium apparatus equipped with a passage aquarium according to the present invention, even if an aquarium pump having a diaphragm is used for pumping water, noise is effectively eliminated during operation, whereby the silence of the environment can be maintained. Since the suction of the pump acts on the outlet opening provided at the top portion of the passage aquarium and directly pumps the water in the passage aquarium, the water in the passage aquarium flows effectively. Therefore, this system prevents fish from dying in the passage aquarium because of stagnation and spoiling of water therein. Furthermore, the initial operation can be conducted by simply activating the aquarium pump. When the aquarium pump is activated, the air in the passage aquarium can be removed and water can be filled in the passage aquarium, whereby water in the passage aquarium can regularly be circulated. Thus, the initial operation can be very easy.

In cases where a passage aquarium is formed to have an inverted U-shaped pipe with openings at both ends thereof and with the end openings disposed in a main aquarium, the ornamental effect can also be enhanced.

The terms and descriptions in this specification are used only for explanatory purposes and the present invention is not limited to these, but many modifications and substitutions may be made without departing from the spirit of the scope of the present invention which is defined by the appended claims.

What is claimed is:

1. An aquarium pump for use both as an air pump and a water pump, comprising:

an electromagnet;

a diaphragm reciprocally driven by said electromagnet;

an outer casing in which said electromagnet and said diaphragm are accommodated;

an inlet outwardly protruding from said outer casing;

an outlet outwardly protruding from said outer casing;

an inlet passage provided in said outer casing, said inlet passage communicating said inlet and an inside of said diaphragm in a fluid-sealed manner; and an outlet passage provided in said outer casing, said outlet passage communicating said outlet and said inside of said diaphragm in a fluid-sealed manner, wherein said inlet, said inlet passage, said inside of said diaphragm, said outlet passage and said outlet constitute a fluidsealed passage so that said aquarium pump functions both as an air pump and a water pump.

2. The aquarium pump for use both as an air pump and a water pump as recited in claim 1, wherein said inlet passage is provided with an inlet valve, and said outlet passage is provided with an outlet valve, whereby air or water is introduced into said diaphragm via said inlet valve when said diaphragm is expanded, and is sent out of said diaphragm via said outlet valve when said diaphragm is compressed.

3. The aquarium pump for use both as an air pump and a water pump as recited in claim 2, wherein said diaphragm is provided with a plurality of inlet valves.

4. The aquarium pump for use both as an air pump and a water pump as recited in claim 3, wherein said diaphragm is provided with a plurality of outlet valves.

5. The aquarium pump for use both as an air pump and a water pump as recited in claim 1, wherein said outer casing is partitioned into a space for disposing said electromagnet and a space for disposing said fluid-sealed passage in a water-sealed manner.

6. The aquarium pump for use both as an air pump and a water pump as recited in claim 5, wherein said outer casing is provided with a water-sealing partition disposed between said electromagnet and said fluid-sealed passage.

7. The aquarium pump for use both as an air pump and a water pump as recited in claim 1, wherein said outer casing includes a lower outer casing with an opened upper end and an upper outer casing fitted on said upper end of said lower outer casing, wherein a first water-sealing partition protrudes upwardly from a bottom wall of said lower outer casing, a second water-sealing partition protrudes downwardly from a top wall of said upper outer casing, and wherein an upper end of said first water-sealing partition and a lower end of said second water-sealing partition are coupled with each other, whereby a space for disposing said electromagnet and a space for disposing said fluid-sealed passage are partitioned in a water-sealed manner.

8. An aquarium pump for use both as an air pump and a water pump, comprising:

an electromagnet;

a plurality of diaphragms reciprocally driven by said electromagnet;

an outer casing for accommodating said electromagnet and said diaphragms;

an inlet outwardly protruding from said outer casing;

an outlet outwardly protruding from said outer casing;

a plurality of inlet passages diverging from said inlet, each of said plurality of inlet passages being communicated with an inside of said respective diaphragm in a fluid-sealed manner; and a plurality of outlet passages diverging from said outlet, each of said plurality of outlet passages being communicated with an inside of said respective diaphragm in a fluid-sealed manner, wherein said inlet, said respective inlet passage, said inside of said diaphragm and said respective outlet passage constitute a fluid-sealed passage so that said aquarium pump functions both as an air pump and as a water pump.

* * * * *